US010735432B2

(12) United States Patent
Bar et al.

(10) Patent No.: US 10,735,432 B2
(45) Date of Patent: Aug. 4, 2020

(54) PERSONALIZED INFERRED AUTHENTICATION FOR VIRTUAL ASSISTANCE

(71) Applicant: MICROSOFT TECHNOLOGY LICENSING, LLC, Redmond, WA (US)

(72) Inventors: Nadav Bar, Tel Aviv (IL); Tom Jurgenson, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/251,913

(22) Filed: Jan. 18, 2019

(65) Prior Publication Data

US 2019/0327237 A1    Oct. 24, 2019

Related U.S. Application Data

(63) Continuation of application No. 15/087,777, filed on Mar. 31, 2016, now Pat. No. 10,187,394.

(51) Int. Cl.
*H01L 29/06* (2006.01)
*H04L 29/06* (2006.01)
*G06F 21/31* (2013.01)

(52) U.S. Cl.
CPC .......... *H04L 63/102* (2013.01); *G06F 21/316* (2013.01); *H04L 63/0853* (2013.01); *H04L 63/1408* (2013.01); *G06F 2221/2111* (2013.01)

(58) Field of Classification Search
CPC .................................................. G06F 21/316
USPC ............................................................ 726/4
See application file for complete search history.

(56) References Cited

U.S. PATENT DOCUMENTS

| 9,009,844 | B1* | 4/2015 | Corn | H04L 9/3271 726/27 |
| 2014/0181931 | A1* | 6/2014 | Bokarius | G06F 21/41 726/6 |
| 2015/0095028 | A1* | 4/2015 | Karpey | G10L 17/26 704/246 |

(Continued)

OTHER PUBLICATIONS

"Office Action Issued in European Patent Application No. 17714358. 3", dated Sep. 6, 2019, 8 Pages.

*Primary Examiner* — Khalil Naghdali
(74) *Attorney, Agent, or Firm* — Shook, Hardy and Bacon, L.L.P.

(57) ABSTRACT

Aspects of the technology described herein provide a mechanism for controlling access to secure computing resources based on inferred user authentication. A current user may be authenticated and access to secure computing resources permitted based on a determined probability that the current user is a legitimate user associated with the secure computing resource. Legitimacy of the current user may be inferred based on a comparison of user-related activity of the current user to a persona model, which may comprise behavior patterns, rules, or other information for identifying a legitimate user. If it is determined that the current user is likely legitimate, then access to secure information may be permitted. However, if it is determined that the current user is likely illegitimate, than a verification procedure may be provided to the current user, such as a temporal, dynamic security challenge based on recent activity conducted by the legitimate user.

20 Claims, 6 Drawing Sheets

(56) References Cited

U.S. PATENT DOCUMENTS

2016/0239649 A1\* 8/2016 Zhao .................... G06F 21/316
2017/0199998 A1\* 7/2017 Bruno .................... G06F 21/34

\* cited by examiner

PERSONALIZED INFERRED AUTHENTICATION FOR VIRTUAL ASSISTANCE

CROSS-REFERENCE TO RELATED APPLICATIONS AND PRIORITY CLAIM

This Non-Provisional patent application is a continuation and claims priority benefit of co-pending U.S. patent application Ser. No. 15/087,777, filed Mar. 31, 2016, titled "PERSONALIZED INFERRED AUTHENTICATION FOR VIRTUAL ASSISTANCE," which is incorporated by reference herein in the entirety.

BACKGROUND

With the rise of cybercrime and computer hacking, computer applications and services must increasingly authenticate users and perform actions to ensure that the users' data is not compromised. Today, passwords are the primary means for protecting users' personal information. But passwords are easily hacked, and even complex passwords, including many multi-factor authentication systems, can be compromised when target by sophisticated cybercriminals. Moreover, such complex passwords are difficult to remember and have led to the rise of password management services, a technical solution that often relies on a single password. But this approach can present a greater problem because all of the user's credentials may be accessed if a hacker is able to compromise the password for the password management services. Further still, many applications and services store the user credential on servers, where they can be targeted by hackers; it is not uncommon to see news reports about these systems hacked causing thousands of user accounts with usernames and passwords to be released.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in this disclosure are directed towards systems and methods for inferred user authentication, which may be used for providing data security and personalization of computer-based services and features. In particular, an authentication mechanism is disclosed that determines a probability that a user, using a computing device to access an application or service, is the legitimate user associated with the application, service, or device. If it is determined that the current user likely is not the legitimate user, than a user-verification procedure may be initiated or access to the legitimate user's sensitive or secure information, applications, or services, may be restricted. On the other hand, if it is determined that the current user is legitimate, which may occur upon a successful outcome of the user-verification procedure, then access to secure information may be provided.

In one aspect, user-related activity of a legitimate user is monitored to determine a user persona model for the legitimate user. The user-related activity may include, for example, user interactions and other information detected by a user computing device, such as further described herein. The user activity of a current user may be monitored and compared to the user-persona model of the legitimate user. Based on the comparison, an authenticity confidence score for the current user may be computed based on a statistical similarity to the persona model of the legitimate user. The authenticity confidence score (authenticity score) may be monitored in an ongoing manner by an application or service, such as a personal digital assistant application or may be checked as needed, such as when the current user attempts to access secure data, applications, or services. In one respect, an embodiment of the technologies described herein may comprise a platform for use with third-party computer services and applications, which may interface with aspects of the authentication mechanisms described herein to determine legitimacy of the user seeking to access the third-party applications or services.

In one aspect, when the authenticity score indicates a current user may not be the legitimate user, such as when the authenticity score falls below a certain threshold, the user may be presented with a dynamic security challenge to validate legitimacy of the current user. The security challenges may be generated and evaluated using the personal digital assistant application (or other application or computer service), which may also manage access to the user's secure information. In one respect, the dynamic security challenge comprises interrogating the current user, which may include generating one or more question-answer pairs and presenting the question(s) to the user. The question-answer pairs may be based on information derived from monitored recent user activity or persona model of the legitimate user.

In this way, the embodiments described herein improve the user computing devices and their operation, as well as applications and services operating on these devices, by improving their security, efficiency, and reliability, such as by reducing exposure to hacking or stealing of the user's secure data. Additionally, embodiments reduce the frequency for which a user must provide his or her security credentials via a computing device, which minimizes exposing the credentials to hacking or stealing.

BRIEF DESCRIPTION OF THE DRAWINGS

Aspects of the technology described in the present application are described in detail below with reference to the attached drawing figures, wherein.

DETAILED DESCRIPTION

Figure 1:
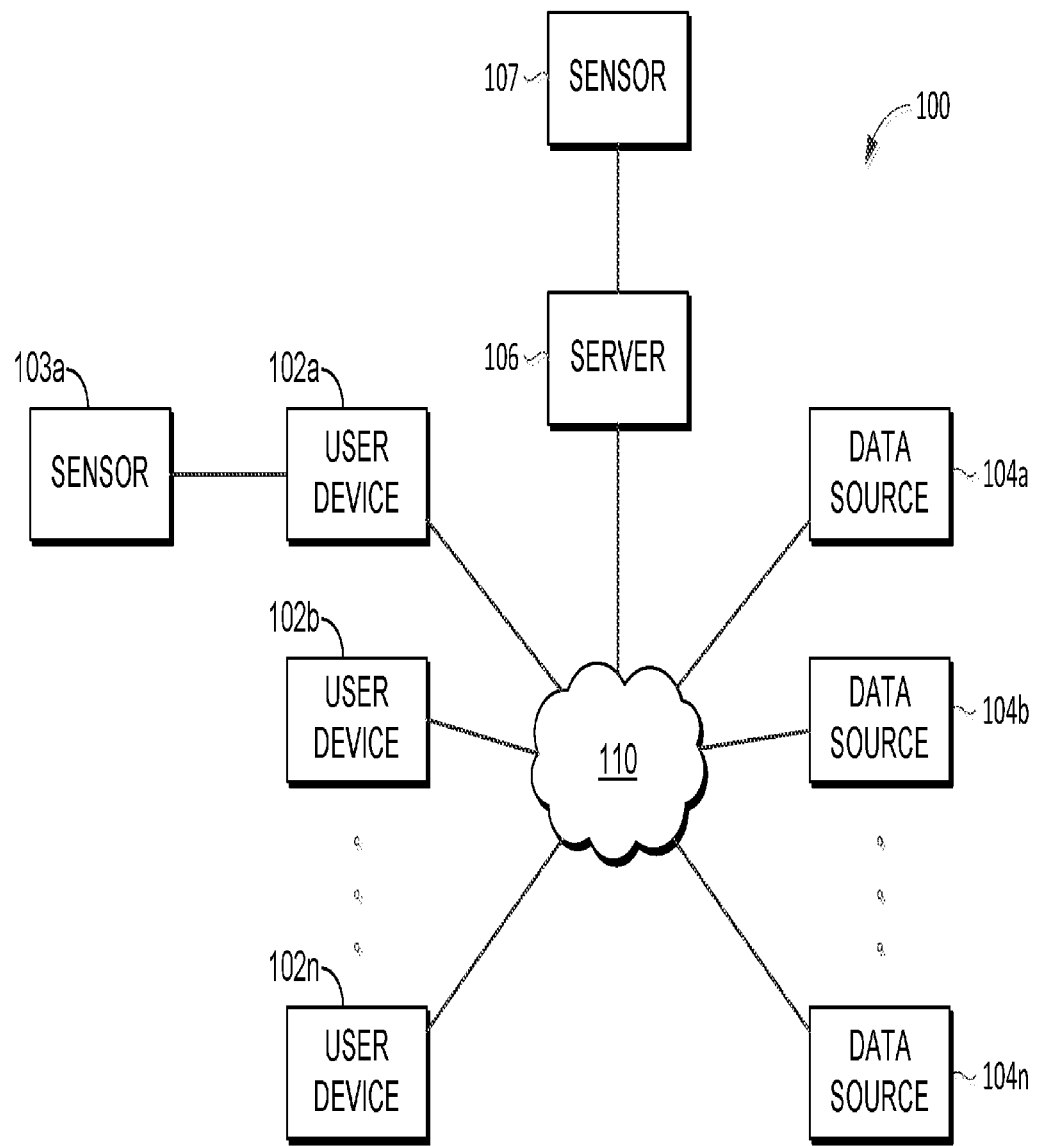
FIG. 1 is a block diagram of an exemplary computing environment suitable for implementing aspects of the technology described herein.

The technology of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides authentication mechanisms for controlling access to sensitive information, secure computer applications, services, and/or other computing resources based on a determined likelihood that a current user, using a computing device to access an application or service, is the legitimate user associated with the application, service, or computing device, such as the rightful owner of the device. In an embodiment, a statistical probability is calculated based, at least in part, on a comparison of current user-related activity information to one or more user persona models associated with the legitimate user. The statistical probability may be expressed or reflected as an authenticity confidence score (authenticity score) that represents the likelihood that the current user is the legitimate user. In some embodiments, the authenticity score may be monitored continuously or periodically by an application or service, such as a personal digital assistant application, running on the user computing device (user device) or in the cloud, or may be checked as needed by such an application or service, for instance, when the current user attempts to access sensitive data, applications, or services.

When it is determined that the current user likely is not the legitimate user or there is uncertainty (i.e. not enough confidence) that the current user is the legitimate user, a user-verification procedure may be initiated and/or access to the legitimate user's sensitive information, such as user passwords, accounts, configuration settings, applications, or services (which may include purchases or transactions), may be restricted or limited. For example, in an embodiment, when the authenticity score is not high enough (indicating a lack of confidence about the user's legitimacy) for the user to access a particular computing resource or carryout a particular activity, such as posting a message on social media (which could be an abuse carried out by an illegitimate user, such as posting malicious content, spam (advertising) or similar unauthorized content. On the other hand, if the authenticity score indicates that the current user is likely legitimate, then access to sensitive information, secure applications, services, or computing resources may be provided, and/or the user persona model may be updated based on monitored user-related activity of the current user. In some embodiments, a successful outcome of the user-verification procedure may be used for updating the statistical likelihood that the current user is legitimate (i.e., answering a question correctly may boost the authenticity score).

As described previously, as a result of the risk and frequency of hacking and malware, current applications and services on the Internet are increasingly likely to implement security and verification technologies, such as user passwords, biometric verification procedures, or the like. Such security mechanisms and procedures are an integral part of utilizing the Internet today. As more and more computer applications and services implement these password security measures, it has become increasingly difficult for the user to remember all of his or her credentials, such as passwords and account information. It also has become more cumbersome for the user to enter his or her credentials each time the user accesses a sensitive application or service; for example, each time the users accesses Facebook, Twitter, or email, which may be multiple times throughout the day.

In many instances, to overcome this burden, users will log-in to these secure applications or services and then stay logged in, thereby eliminating the need for the user to re-enter his or her credentials each time they access the secure application or service. For instance, a user may enable the user device, browser, or application to "remember" the user's credentials, or may otherwise lower the default security measures for accessing the application or service. Alternatively, users may rely on a password manager application or service for remembering and managing their credentials and/or other sensitive information. But while these technologies improve user convenience, they make it significantly easier for an illegitimate user or hacker to access the user's sensitive information. In particular, in many instances the illegitimate user or hacker only needs physical or remote access to the user device in order to access the now-insecure applications and services operating on the user device. Or in the case of a password manager, the unauthorized user only needs to compromise a single password to gain access to all of the user's credentials. There are some types of malware, for instance, that specifically target and steal user passwords stored in or entered via the browser.

Embodiments of the technologies described herein solve these problems and further improve Internet security while providing convenience of the approaches described above without exposing the user's sensitive information to abuse and theft. Embodiments also improve the security and reliability of the user device and the user's sensitive information, as described herein. In particular, instead of the normal course of procedure for accessing a secure application or service (wherein a user is prompted for credentials—typically a static password—and then upon successfully entering the credentials, the user is granted access to the application or service for a session of time), some embodiments described herein eliminate or modify this procedure by enabling a personal digital assistant (PDA) or other computer application or service to manage and provide the user's credentials when needed, based on a determined legitimacy of the current user, as described herein. Moreover, as further described in connection to certain embodiments of this disclosure, which may be implemented as a platform, the PDA (or application or service) may vouch for the current user's legitimacy in place of that user entering, providing, or otherwise facilitating by the user the communication of the credentials to the secure application or service, thereby reducing exposure of these credentials to keylogging, sniffing, copying, or other compromise.

Still further, some embodiments enable the credentials to be securely stored in a manner that protects them from hacking should the user device become compromised; for example, by storing the credentials in a credentials vault in the cloud. Accordingly the embodiments described herein enable legitimate users to safely and securely conduct Internet transactions, and conduct user sessions using secure applications and services without necessarily needing to: remember passwords for each application or service, rely on vulnerable password managers, or be interrupted frequently (such as with each access to a secure application) with password-entry prompts, biometric tests, or similar security procedures. User efficiency and machine efficiency is therefore improved, user convenience is maintained, the user's sensitive information is better protected, and the user computing device operation is improved by becoming more secure and hardened to hacking and cyber-abuse.

Accordingly, as will be further described, in one embodiment, user-related activity of a legitimate user is monitored to determine a user persona model for the legitimate user. The user-related activity may include user interactions with one or more user devices associated with the legitimate user, and other information detected by the user device(s) or in the cloud, such as user activity associated with applications, services, or online accounts of the legitimate user. By way of example and not limitation, this may include user device location-information, such as geographical location, venue, time spent at a location, frequented locations, patterns or sequences of locations visited; network connection(s), such as familiar the wireless network(s) a user device is connected to or detects; user activity conducted via a user device including user interactions with an application or service via the device such as browsing history applications used, or content accessed; communication events such as email, text messaging, calls, missed calls, voice-mails, for example; social media activity or online activity including posts, check-ins, tweets, purchases or transactions; or nearly any other user-related activity, including device-related activity, sensed or otherwise detectable via a computing device associated with the user. The user-related activity of the legitimate user also may be used for generating security challenges such as the question-answer pairs described herein.

Similarly, user-related activity of a current user may be monitored and compared to the user-persona model of the legitimate user. The current user may include the present user or a user associated with a contemporary user-session (or recently occurring time frame) of the user device (or application or service). The user-related activity of a current user may be compared to the user-persona model of the legitimate user. For example, in one embodiment, legitimate user-related activity may be inferred from the personal model and compared against current user-related activity. Based on the comparison, an authenticity confidence score for the current user may be computed according a statistical similarity (or difference) to a persona model of the legitimate user. The authenticity confidence score (or authenticity score) may be determined in an ongoing or continuous manner, periodically, or as needed using various input user-data sensed, detected, or otherwise determined via the user device(s), as further described herein.

Additionally, in some embodiments, static business rules, which may be defined by an employee-user or system administrator of a business, such as corporate passwords, pin numbers, or company security measures, may also be incorporated into determining the authenticity score. For instance, in an embodiment, where a user fails to correctly enter a password to access his or her corporate VPN account, the authenticity score may be lowered, because a legitimate user should be able to supply the correct credentials. As a result, the user's capability to access other secure applications, services, or computing resources, or other sensitive data may be impacted due to the lower authenticity score. Thus, contrary to the conventional operation of secure applications and services, which are generally independent of each other, in this instance, even where a current user tries unsuccessfully to access the VPN account and gives up, that user may be unable to access other secure resources unrelated to the VPN account. Whereas according to the convention, if a user fails to access any one secure application or service (e.g. an email account), the user is not blocked or any way limited from attempting to access another secure application or service (e.g., a Bank's website or social media account).

In some embodiments, when the authenticity score indicates a current user may not be the legitimate user, such as when the score falls below a certain threshold, the user may be presented with a dynamic security challenge to validate legitimacy of the user. In embodiments, the threshold may be pre-determined by the user, application, or service, and may vary according to the sensitivity level of information or services being accessed. For instance, accessing email may require a lower threshold than accessing a mobile banking application. The security challenges may be generated and evaluated using the personal digital assistant program (PDA), or other application or computer service, which may also manage access to the user's sensitive information.

In an embodiment, the security challenge comprises interrogating the current user, such as by presenting the user with questions derived from recent user-related activity of the legitimate user. For instance, a security challenge may ask the user to name the contact that the user called the most during the last three days. Another security challenge may ask the user "which sushi place did you visit last week?" Yet another security challenge may ask the user how far they ran during their last workout or what the weather was like. In this way, a security challenge may be temporal as well as dynamic, and thus harder to compromise than traditional security measures. That is, unlike a traditional password or even biometric authentication, which is static, the information used to generate security challenges changes over time, and thus the answers to the security challenges also change over time. This provides a significant improvement over traditional password-based security and authorization mechanisms, because it is highly improbable that a hacker or unauthorized user would know or be able to determine the answers to such questions.

Moreover, some embodiments, which may be deeply integrated into the operating system of the user device, can monitor the user to determine if the user is checking call logs or other user-history on the user device in order to answer the security challenge. Where this type of cheating activity is detected, a different security challenge may be presented, or the current user may be blocked (i.e., access to sensitive information may be restricted). Furthermore, according to some embodiments, the user-related activity for determining the authenticity score and generating security challenges may be monitored across multiple user devices associated with the legitimate user, thereby making the user's secure information even more resistant to hacking and unauthorized access. Thus, although it is commonplace for users today to have multiple computing devices (e.g. phone, tablet, laptop, fitness device, etc.) which ordinarily increases their risk of exposure to hacking since any one of these devices could be compromised, these embodiments of this disclosure can provide even further increased security by utilizing information about the legitimate user activity detected across the multiple computing devices.

The security challenges may be generated and evaluated using the personal digital assistant program (PDA) or other application or computer service running on the user computing device(s) or in the cloud, which may also manage access to the user's sensitive information. In an embodiment, the user-related activity information used for generating security challenges may be derived only during user sessions wherein the authenticity score is sufficiently high, such as above a threshold indicating that it is very likely that the current user is the legitimate user. In this way, even where a hacker or unauthorized user gains access to a user device and uses it for a period of time, the hacker or unauthorized user is still unlikely to be able to complete the security challenge(s) because it will be based on information derived from one or more sessions where the user was likely legitimate.

Additionally, in an embodiment, crowd-sourced information may be used for determining security challenges and/or a user persona for the legitimate user. For example, a user persona may be determined that includes information indicating that a user is with (or was with) other people (other users of other user devices), which may include contacts or social media friends, and may be determined from social media activity (e.g., posts or check-ins to the same location) or sensed from user-device location information shared from the other users. Thus, a security challenge may prompt a current user to name the contact they had lunch with yesterday, or the contact that they workout with each weekend.

In a similar manner, in one aspect, the user persona model (or models) is generated and/or updated during sessions of time for which it is determined that there is a sufficient confidence that the current user is the legitimate user, which may be indicated by the authenticity score. For instance, in one embodiment, the persona model may be updated during a time frame, or a user session, immediately following the user's providing security credentials, such as a login ID and password, biometric identification, similar verification, or following the user's successful answer to a security challenge, or other time frames that the authenticity score is as above a threshold, indicating sufficient confidence that the current user is a legitimate user, as described herein.

Having briefly described an overview of aspects of the technology described herein, an example operating environment suitable for use in implementing the technology is now described. With reference to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 210 of FIG. 2.

Figure 2:
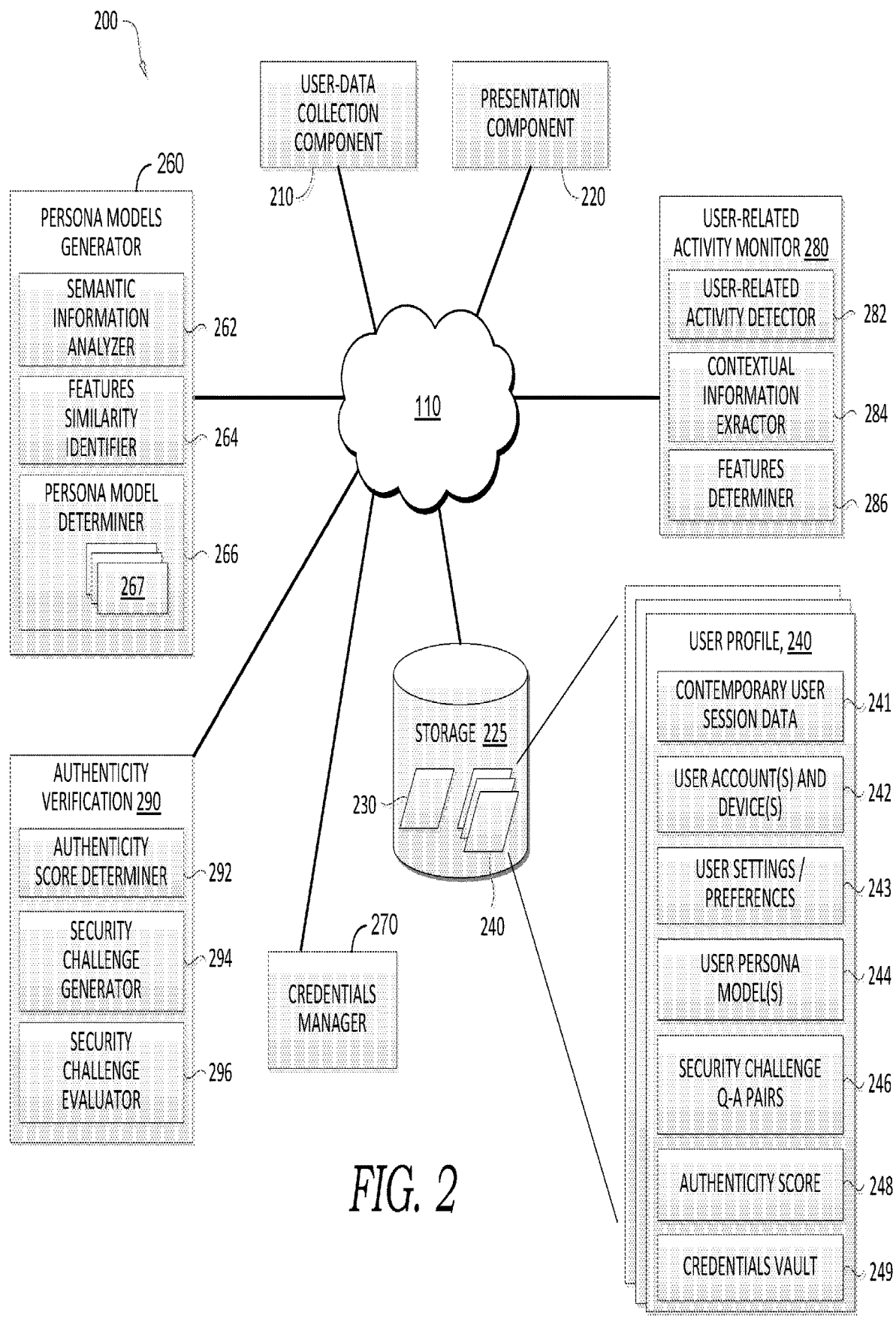
FIG. 2 a diagram depicting an example computing architecture suitable for implementing aspects of the present disclosure.
Figure 3:
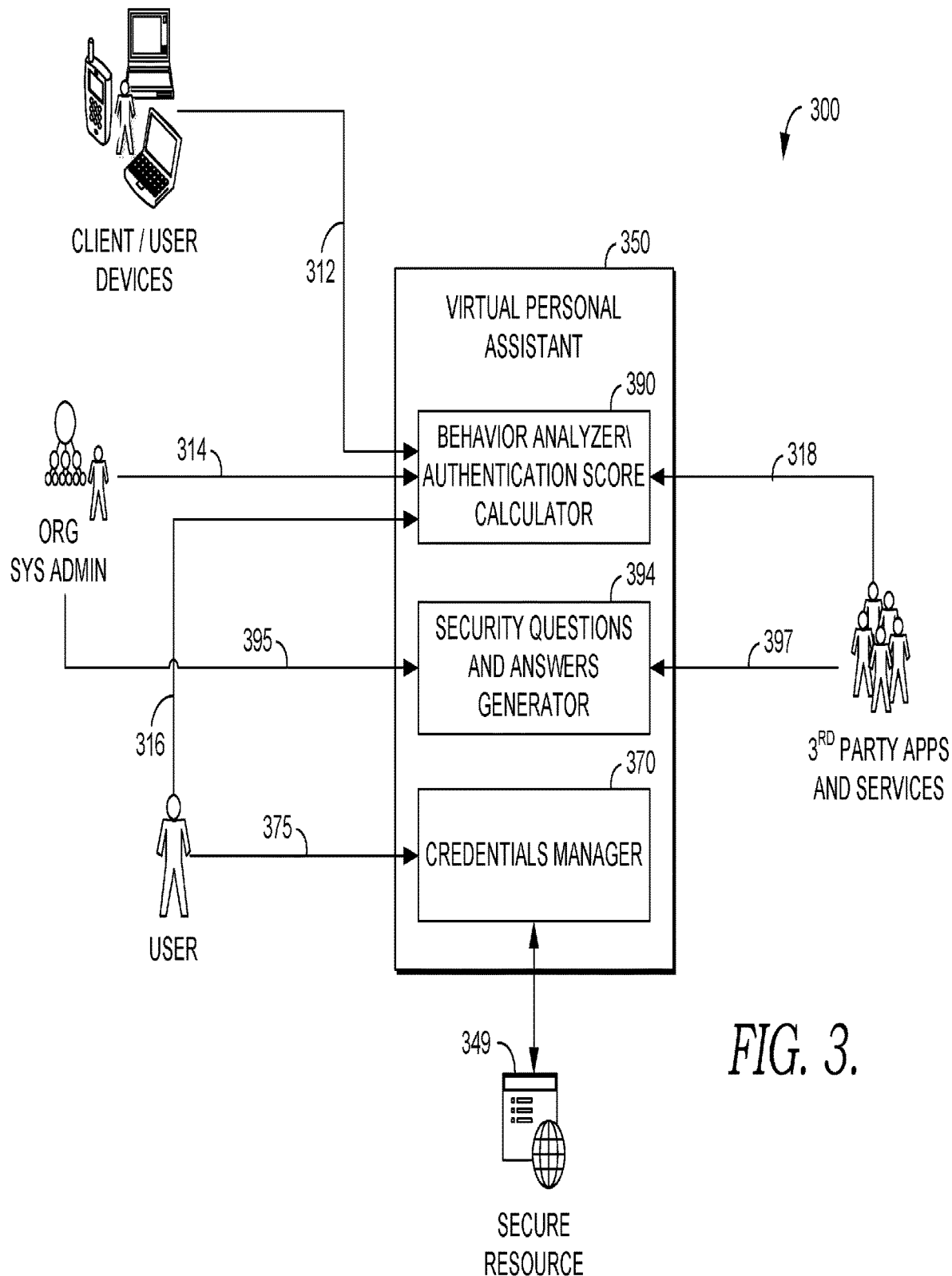
FIG. 3 illustratively depicts aspects of an example personalized and inferred user-authentication system, in accordance with an embodiment of the present disclosure.

Operating environment 100 can be utilized to implement one or more of the components of system 200, described in FIG. 2, and system 300, described in FIG. 3, including components for collecting user data; monitoring user-related activity information; determining or updating user persona models; managing a user's credentials, sensitive information, or access to secure applications, services, or computing resources; verifying the user's authenticity; and/or generating or presenting notifications and related content, which may include personalized content, to a user. Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, user-related activity monitor 280, persona models generator 260, credentials manager 270, authenticity verification 290, and storage 225. User-related activity monitor 280 (including its components 282, 284, and 286), persona models generator 260 (including its components 262, 264, 266 and 267), user-data collection component 210, presentation component 210, credentials manager 270, and authenticity verification 290 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal digital assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client computing devices (such as user device 102a), in the cloud, or may reside on a user device, such as user device 102a. Moreover, these components, functions performed by these components, or services carried out by these components may be implemented at appropriate abstraction layer (s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be utilized to facilitate the accumulation of user data of a particular user (or in some cases, a plurality of users including crowd-sourced data) for user-related activity monitor 280, persona models generator 260, or authenticity verification 290. The data may be received (or accessed), and optionally accumulated, reformatted and/or combined, by data collection component 210 and stored in one or more data stores such as storage 225, where it may be available to other components of system 200. For example, the user data may be stored in or associated with a user profile 240, as described herein. In some embodiments, any personally identifying data (i.e. user data that specifically identifies particular users) is either not shared or made available to anyone other than the user, is not permanently stored, and/or is not made available to user-related activity monitor 280 and/or persona models generator 260.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-related activity information (for example: app usage; online activity; searches; file-related activity including cloud-storage related activity; audio or voice data such as acoustic information or data from automatic speech recognition processes; activity logs; communications data including calls, texts, instant messages, and emails; website posts; other user-data associated with communication events; etc.) including, in some embodiments, user-related activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In some respects, user data may be provided in user-data streams or signals. Thus, a "user signal" can be considered a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User-related activity monitor 280 is generally responsible for monitoring user data for information that may be used for determining user-related activity information, which may include identifying and/or tracking features (sometimes referred to herein as "variables") or other information regarding specific user activity and related contextual information. Embodiments of user-related activity monitor 280 may determine, from the monitored user data, user activity, and related information, associated with a particular user. As described previously, the user-related activity information determined by user activity monitor 280 may include user activity information from multiple user devices associated with the user and/or from cloud-based services associated with the user (such as email, calendars, social-media, or similar information sources), and which may include contextual information associated with the identified user activity, such as location, networks detected, proximity to other users, or other contextual information as described herein. User-related activity monitor 280 may determine current or near-real-time user activity information and may also determine historical user activity information, in some embodiments, which may be determined based on gathering observations of user activity over time, accessing user logs of past activity (such as browsing history, for example). Further, in some embodiments, user-related activity monitor 280 may determine user-related activity (which may include historical activity) from other users associated with particular user (i.e. crowdsourcing), as described previously.

In some embodiments, information determined by user-related activity monitor 280 may be provided to persona models generator 260 including information regarding the context and historical observations. Some embodiments may also provide user-related activity information, such as user-related activity associated with a current user (current user activity), to authenticity verification 270. As described previously, user activity features may be determined by monitoring user data received from user-data collection component 210. In some embodiments, the user data and/or information about the user-related activity determined from the user data is stored in a user profile, such as user profile 240.

In an embodiment, user-related activity monitor 280 comprises one or more applications or services that analyze information detected via one or more user devices used by the user and/or cloud-based services associated with the user, to determine activity information and related contextual information. Information about user devices associated with a user may be determined from the user data made available via user-data collection component 210, and maybe provided to user-related activity monitor 280, persona models generator 270, authenticity verification 290, or other components of system 200.

In some embodiments, user-related activity monitor 280, one or more of its subcomponents, or other components of system 200, such as persona models generator 260 may determine interpretive data from received user data. Interpretive data corresponds to data utilized by these and other components or subcomponents of system 200 to interpret user data. For example, interpretive data can be used to provide context to user data, which can support determinations or inferences made by the components or subcomponents. For instance, in some embodiments interpretive data comprises statistical ratios of feature values (sometimes referred to as "relative features") used for determining locations (or venues), networks, or activity patterns frequently associated with a user. Moreover, it is contemplated that embodiments of user-related activity monitor 280, its subcomponents, and other components of system 200 may use user data and/or user data in combination with interpretive data for carrying out the objectives of the subcomponents described herein.

Some embodiments of user-related activity monitor 280 may determine, from the user data, one or more user devices associated with a particular user and user device related activity, (which may include contextual information associated with the identified user device(s)). In an embodiment, user-related activity monitor 280 comprises one or more applications or services that analyze the user devices used by the user to determine information about the devices and device usage. In some embodiments, user-related activity monitor 280 monitors user data associated with the user devices and other related information on a user device, across multiple computing devices or in the cloud. Information about the user's user devices may be determined from the user data made available via user-data collection component 210, and maybe provided persona models generator 260 or authenticity verification 290, among other components of system 200. In some implementations of user-related activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. Similarly, some embodiments of user-related activity monitor 280, or its subcomponents, may determine a device name or identification (device ID) for each device associated with a user.

This information about the identified user device(s) associated with a user may be stored in a user profile associated with the user, such as in user account(s) and device(s) 242 of user profile 240. In an embodiment, the user devices may be polled, interrogated, or otherwise analyzed to determine information about the devices. This information may be used for determining a label or identification of the device (e.g. a device id) so that the user interaction with device may be recognized from user data by user-related activity monitor 280. In some embodiments, users may declare or register a device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

As shown in example system 200, user-related activity monitor 280 comprises a user-related activity detector 282, contextual information extractor 284, and an activity features determiner 286. Additionally, although several examples of how user-related activity monitor 280 and its subcomponents may identify user-related activity information are described herein, many variations of user-related activity identification and user-related activity monitoring are possible in various embodiments of the disclosure.

User-related activity detector 282, in general, is responsible for determining (or identifying) a user action or activity event has occurred. Embodiments of activity-related detector 282 may be used for determining current user activity or one or more historical user actions. Some embodiments of activity detector 282 may monitor user data for activity-related features or variables corresponding to user activity such as indications of applications launched or accessed, files accessed, modified, copied, etc., websites navigated to, online content downloaded and rendered or played, or similar user activities, as well as related features, which may be contextual, such as location or environmental features (e.g., communication networks, acoustic information, time of day, duration, proximity of other users, such as users who are contacts, proximity of or user activity on other user devices associated with the user, or other detectable features related to user activity.

Additionally, some embodiments of user-related activity detector 282 extract from the user data information about user activity, which may include current user activity, historical user activity, and/or related information such as contextual information. (Alternatively or in addition, in some embodiments contextual information extractor 284 determines and extracts contextual information. Similarly, in some embodiments, activity features determiner 286 extract information about user activity, such user activity related features, based on an identification of the activity determined by user-related activity detector 282.) Examples of extracted user-related activity information may include, without limitation, location(s), date or time, app usage, online activity, searches, calls, usage duration, application data (e.g. emails, messages, posts, user status, notifications, etc.), audio or visual information (which may be detected by a microphone, camera, or similar sensor on or associated with a user device) or nearly any other data related to user interactions with the user device or user activity via a user device that may be detected or determined. Among other components of system 200, the extracted user activity information determined by user-related activity detector 282 may be provided to other subcomponents of user-related activity monitor 280, persona models generator 260, or authenticity verification 290. Further, the extracted user-related activity may be stored as part of one or more user persona models associated with the user, such as in user persona models component 244 of user profile 240. In some embodiments, user-related activity detector 282 or user-related activity monitor 280 (or its other sub components) performs conflation on the detected user-relatyed activity information. For example, overlapping information may be merged and duplicated or redundant information eliminated.

In some embodiments, the user activity-related features may be interpreted to determine user-related activity has occurred. For example, in some embodiments, activity detector 282 employs user-related activity event logic, which may include rules, conditions, associations, classification models, or other criteria to identify user-related activity. For example, in one embodiment, user-related activity event logic may include comparing user-related activity criteria with the user data in order to determine that an activity-related event has occurred. The activity event logic can take many different forms depending on the mechanism used to identify an activity-related event. For example, the user-related activity event logic could be training data used to train a neural network that is used to evaluate user data to determine when an activity event has occurred. The activity event logic may comprise fuzzy logic, neural network, finite state machine, support vector machine, logistic regression, clustering, or machine learning techniques, similar statistical classification processes or, combinations of these to identify activity events from user data. For example, activity event logic may specify types of user device interaction(s) information that are associated with an activity event, such as a navigating to a website, composing an email, or launching an app. In some embodiments, a series or sequence of user device interactions may be mapped to an activity-related event, such that the activity event may be detected upon determining that the user data indicates the series or sequence of user interactions has been carried out by the user.

In some embodiments, activity event logic maybe specify types of user-device related activity that is considered user activity, such as activity that happens while a user is logged into the user device, while user interfaces are receiving input (e.g. while a computer mouse, touchpad, screen, voice-recognition interface, or the like are active), while sensors associated with the device as it's being used are detecting information, or certain types of activity like launching applications, modifying files with applications, opening a browser and navigating to a website, etc. In this way, the activity-related event logic may be used to distinguish genuine user activity from automated activity of processes running on the user devices, such as automatic updates or malware scanning. Once a user activity is determined, these features or additional related features may be detected and associated with the detected activity for use in determining activity-related patterns or persona models.

In some embodiments, user-related activity detector 282 runs on or in association with each user device for a user. Activity detector 282 may include functionality that polls or analyzes aspects of the operating system to determine user activity related features (such as installed or running applications or file accesses and modifications, for example) network communications, and/or other user actions detectable via the user device including sequences of actions.

In some embodiments, such as the embodiment shown in system 200, user-related activity detector 282 includes functionality for logging application activity and/or browsing activity. This functionality may be embodied as client-side applications or services that run on each user device associated with a user, and in some embodiments may run in conjunction with applications or inside (or as a part of) applications, such as within a browser or as a browser plug-in or extension. In such embodiments, an application activity logger (not shown), in general, manages logging of a user's application (or app) activity, such as application download, launch, access, use (which may include duration), file access via the application, and in-application user activity (which may include application content). Browse activity logger (not shown), in general, manages logging of a user's browse activity, such as websites visited, social media activity (which may include browse-type activity conducted via specific browsers or apps like the Facebook® app, Twitter® app, Instagram® app, Pinterest® app, etc.) content downloaded, files accessed, and other browse-related user activity. In some embodiments, each browser on a user device is associated with an instance of browse activity logger, or alternatively a plugin or service that provides browse information. In some embodiments, application and browse activity loggers may also perform functionality described in connection with contextual information extractor 284, such as logging timestamps, location stamps, user-device related information, or other contextual information that is associated with the logged app activity or browse activity. In some embodiments, application and browse activity loggers provide logged user activity information to persona models generator 260, authenticity verification 290, and/or store the logged activity information in a user profile associated with the user, such as in contemporary user session data 241 or as part or user persona model(s) 244 of user profile 240.

Further still, in some embodiments, third party-services or applications may provide information about a user-related activity (or about the user) to user-related activity detector 282, user-related activity monitor 280, or other components of system 200 (such as persona models generator 260 or authenticity verification 290). In this sense, such embodiments of the disclosure may operate as a platform, as further described herein, thereby enabling third party applications and services to interact with or exchange information with (or receive information from or provide information to) components of system 200. For instance, a social media network may provide information about a user's activity, such as a recent comment posted by the user, a check-in, "tag," or a "like."

Contextual information extractor 284, in general, is responsible for determining contextual information related to the user activity (detected by user-related activity detector 282 or user-related activity monitor 280), such as context features or variables associated with user activity, related information, and user-related activity, and further responsible for associating the determined contextual information with the detected user activity. In some embodiments, contextual information extractor 284 may associate the determined contextual information with the related user activity and may also log the contextual information with the associated user activity. Alternatively, the association or logging may be carried out by another service. For example, some embodiments of contextual information extractor 284 provide the determined contextual information to activity features determiner 286, which determines activity features of the user activity and/or related contextual information.

Some embodiments of contextual information extractor 284 determine contextual information related to a user interaction or activity event such as entities identified in a user activity or related to the activity (e.g., recipients of a call by the user or an email sent by the user), user activity associated with the location or venue of the user device, or other information about the environment of the user device. By way of example and not limitation, this may include context features such as location data; which may be represented as a location stamp associated with the activity; contextual information about the location, such as venue information (e.g. this is the user's office location, home location, school, restaurant, move theater, etc.), yellow pages identifier (YPID) information, time, day, and/or date, which may be represented as a timestamp associated with the activity; user device characteristics or user device identification information regarding the device on which the user carried out the activity; duration of the user activity, other user activity/activities preceding and/or following the user activity (such as sequences or types of websites visited (e.g., a financial website or a secure website that requires credentials in order to access), a sequence of online searches conducted, sequences of application usage, website usage, or other activity such as browsing to a bank and then accessing an Excel® spreadsheet file to record financial information, activity related to providing credentials into a secure website, application or service, including successful outcomes, failed attempts, and activity before and after failed attempts), other information about the activity such as entities associated with the activity (e.g. venues, people, objects, etc.), information detected by sensor(s) on user devices associated with the user that is concurrent or substantially concurrent to the user activity (e.g. motion information or physiological information detected on a fitness tracking user device, listening to music, which may detected via a microphone sensor if the source of the music is not a user device), communication networks detectable by the user device, visual, audio, or other environmental information detectable by a user device, or any other information related to the user activity that is detectable that may be used for determining current user activity and patterns of user activity or persona models associated with a user.

In some implementations, contextual information extractor 284 may receive user data from user-data collection component 210, parse the data, in some instances, and identify and extract context features or variables (which may also be carried out by activity features determiner 286). Context variables may be stored as a related set of contextual information associated with the user activity, and may be stored in a user profile such as in contemporary user session data 241 or as part of information in a persona model stored in user persona models 244. In some embodiments, contextual information may be determined from the user data of one or more users, in some embodiments, which may be provided by user-data collection component 210 in lieu of or in addition to user activity information for the particular user.

Activity features determiner 286 is generally responsible for determining activity-related features (or variables) associated with the user-related activity that may be used for determining contemporary user session data, for identifying patterns of user activity, which may be used for generating a personal model, or for other information associated with a user that is part of a persona model. Activity features may be determined from information about a user-related activity and/or from related contextual information. In some embodiments, activity features determiner 286 receives user-activity or related information from user-related activity monitor 280 (or its subcomponents), and analyzes the received information to determine a set of one or more features associated with the user activity.

Examples of activity-related features include, without limitation, location-related features, such as location of the user device(s) during the user activity, venue-related information associated with the location, or other location-related information; time related features, such as time(s) of day(s), day of week or month the user activity, or the duration of the activity, or related duration information such as how long the user used an application associated with the activity; user device-related features, such as device type (e.g. desktop, tablet, mobile phone, fitness tracker, heart rate monitor, etc.) hardware properties or profiles, OS or firmware properties, device IDs or model numbers, network-related information (e.g. mac address, network name(s), IP address, domain(s), work group(s), information about other devices detected on the local network, router information, proxy or VPN information, other network connection information, etc.), position/motion/orientation related information about the user device, power information such as battery level, time of connecting/disconnecting a charger, user-access/touch information; usage related features, such as file(s) accessed, app usage (which may also include application data, in-app usage, concurrently running applications), network usage information, user account(s) accessed or otherwise used, (such as device account(s), OS level account(s), or online/cloud-services related account(s) activity, such as Microsoft® account or Net Passport, online storage account(s), email, calendar, or social networking accounts, etc.; content-related features, such as online activity (e.g. searches, browsed websites, purchases, social networking activity, communications sent or received including social media posts; other features that may be detected concurrent with the user activity or near the time or the user activity; or any other features that may be detected or sensed and may be used, in some embodiments, for determining a one or more patterns activity, as further described in connection to persona models generator 260. Features may also include information about user(s) using the device; other information identifying a user, such as a login password, biometric data, which may be provided by a fitness tracker or biometric scanner; and/or characteristics of the user(s) who use the device, which may be useful for distinguishing users on devices that are shared by more than one user. In some embodiments, user activity event logic (described in connection to user-related activity detector 282) may be utilized to identify specific features from user-related activity information.

Continuing with system 200 of FIG. 2, persona models generator 260 is generally responsible for generating (or updating) a persona model corresponding to a legitimate user. A persona model comprises a set of information about a legitimate user (or users) that may be used to determine a confidence value about the legitimacy of a current user by comparing user-related activity of the current user against information in the persona model. A persona model generated or updated by persona models generator 260 may be stored in (or accessed from, in the case of updating or utilizing the persona model) a user profile associated with the legitimate user, such as user persona model(s) component 244 of user profile 240.

In one embodiment, the information in a persona model comprises one or more patterns of user-behavior for a legitimate user, related contextual information associated with the legitimate user (such as locations, communication networks, environmental features, or other contextual data described herein), for instance, a geographic location frequently associated with the legitimate user at a certain time of day, such as at night (i.e., the location of the legitimate user's home) or during the weekday (i.e., the location of the user's work); these frequented locations are sometimes referred to as hubs.

In some embodiments, persona models generator 260 may run on a server, as a distributed application across multiple devices, or in the cloud. At a high level, persona models generator 260 receives information related to a legitimate, which may include user user-activity-related information and/or contextual (or other related) information for the legitimate user, which may be provided from user-related activity monitor 280, user-data collection component 210, or user-activity logs from client-side applications or services associated with user-related activity monitor 280. In an embodiment, the information related to a legitimate (legitimate user-related information) is determined to be related to a legitimate user (versus an illegitimate user) when the information is derived, generated, detected, or otherwise determined while the authenticity score indicates a likelihood that the current user is legitimate. In some embodiments, legitimate user-related information also may be provided by a system administrator associated with the legitimate user; for instance, business rules, corporate passwords or other credentials, or other policies (e.g., information indicating that in order to be considered "legitimate" the user must be using an authorized communication network, such as a corporate internet connection or VPN, or a specific IP address or range.

As described herein, persona models generator receives legitimate user-related information and determines a model comprising activity patterns and/or other information associated with the legitimate user(s) that may be used to distinguish from an illegitimate user. By way of example and not limitation, information associated with a user that may be included in a person a model may include information characterizing the legitimate user, such as biometric data, voice patterns, information about user devices associated with the legitimate user, other people (e.g., social media friends or contacts) associated with the legitimate, facts or information learned about the legitimate user that may be used to identify the user such as user-related activity information, information learned from third-party applications and services, social media, information explicitly provided by the legitimate user or a system administrator associated with the legitimate user, such as described previously, and/or activity patterns associated with the legitimate user, which may include patterns of interaction with one or more user devices associated with the legitimate user or behavior patterns of the legitimate user, as further described herein. As described previously, in some instances, a persona model may be determined using information derived from third-party applications or services. But in some embodiments, aspects of the persona model may also be provided by these third-party applications or services, as further described herein.

The information learned and/or retained about the legitimate user in a persona model is made accessible to the legitimate user, in some embodiments, so that a user can specify whether particular data should be preserved or whether to delete certain portions of the data, for instance, a feature such as Microsoft Cortana's Notebook. In some embodiments a legitimate user consents and ops into having information about themselves used for generating and using a persona model. Moreover, in some embodiments, the information about the legitimate user is encrypted, hardened, and/or represented in a secure format, such as using a hash function, so that it may be used for distinguishing from an illegitimate user, but not abused, should it be breached or otherwise hacked into. (In other words, in some embodiments, the information may be stored in a format that is usable for distinguishing the legitimate user from an illegitimate user, but unusable for learning about the legitimate user.)

Persona models generator 260, or its subcomponents, such as persona model determiner 266, may determine a set of likely user patterns associated with the legitimate user that may be used to identify the legitimate user. In particular, one or more inference algorithms may be applied to the legitimate user-related information to determine the set of likely user activity patterns. For example, patterns may be determined based on similar instances of observation of user activity or associated contextual information, which may be referred to as "in-common features" of legitimate user-related information. The inferred activity pattern information may be incorporated into (or associated with) one or more of the persona models, where it may be used to generate a pattern based prediction regarding likely future user-related activity. In this way, it may be utilized to determine whether observed user-related activity of a current user (sometimes referred to herein as "contemporary user session data") is likely to be from the legitimate user. For instance, where the contemporary user session data matches predicted patterns of the legitimate user, it is likely that the current user is legitimate (and the authenticity score may be adjusted to indicate this). The inferred activity pattern information (or other information from the user person model) also may be used for determining security challenges. For instance, information indicating locations frequented by the legitimate user, such as restaurant venue visited multiple times recently, or the location of the legitimate user's gym, may be used as question-answer pairs to interrogate the current user in order to determine legitimacy.

In some embodiments, a corresponding pattern confidence is also determined for the inferred patterns (or predictions based on the patterns). Further, the activity pattern (or prediction of future action based on a pattern) may comprise a single (future-occurring) user activity likely to occur, a sequence of future user actions, or probabilities for more than one future action; for example, and eighty percent likelihood that the next action will be browsing to website A and a fifteen percent likelihood that the next action will be launching a music player application, and a five percent likelihood that the next action will be browsing to website B.

As shown in example system 200, persona models generator 260 comprises semantic information analyzer 262, features similarity identifier 264, and persona model determiner 266. Semantic information analyzer 262 is generally responsible for determining semantic information associated with the activity features identified by user-related activity monitor 280. For example, while a user-activity feature may indicate a specific website visited by the user, semantic analysis may determine the category of website, related websites, themes or topics or other entities associated with the website or user activity. Semantic information analyzer 262 may determine additional activity features semantically related to the user activity, which may be used for identifying user-related activity patterns.

In particular, as described previously, a semantic analysis may be performed on the user-related activity information, which may include the contextual information, to characterize aspects of the user action or activity event. For example, in some embodiments, activity features associated with an activity event may be classified or categorized (such as by type, timeframe or location, work-related, home-related, themes, related entities, other user(s) (such as communication to or from another user) and/or relation of the other user to the user (e g family member, close friend, work acquaintance, boss, or the like), or other categories), or related features may be identified for use in determining a similarity or relational proximity to other user activity events, which may indicate a pattern. In some embodiments, semantic information analyzer 262 may utilize a semantic knowledge representation, such as a relational knowledge graph. Semantic information analyzer 262 may also utilize semantic analysis logic, including rules, conditions, or associations to determine semantic information related to the user activity. For example, a user activity event comprising an email sent to someone who works with the user may be characterized as a work-related activity. Thus where the user emails some person she works with every Sunday night, but not necessarily the same person, a pattern may be determined (using activity pattern determiner 266) that the user performs work-related activities every Sunday night. Accordingly, a persona model associated with the legitimate user may be determined to indicate this pattern.

Semantic information analyzer 262 may also be used to characterize contextual information associated with the user activity event, such as determining that a location associated with the activity corresponds to a hub or venue of interest to the user (such as the user's home, work, gym, or the like) based on frequency of user visits. For example, the user's home hub may be determined (using semantic analysis logic) to be the location where the user spends most of her time between 8 PM and 6 AM.) Similarly, the semantic analysis may determine time of day that correspond to working hours, lunch time, commute time, etc. Similarly, the semantic analysis may categorize the activity as being associated with work or home, based on other characteristics of the activity (e.g. a batch of online searches about chi-squared distribution that occurs during working hours at a location corresponding to the user's office may be determined to be work-related activity, whereas streaming a movie on Friday night at a location corresponding to the user's home may be determined to be home-related activity). In this way, the semantic analysis provided by semantic information analyzer 262 may provide other relevant features of the user activity events that may be used for determining user-related activity patterns. For example, where the user activity comprises visiting CNN.com over lunch and the semantic analysis determines that the user visited a news-related website over lunch, a pattern of user activity may be determined indicating that the user routinely visits news-related websites over lunch, even though the user may only visit CNN.com occasionally.

Features similarity identifier 264 is generally responsible for determining similarity of activity features of two or more user activity events (put another way, activity features characterizing a first user activity event that are similar to activity features characterizing a second user activity event). The activity features may include features relating to contextual information and features determined by semantic analyzer 262. Activity events having in-common activity features may be used to identify an activity pattern, which may be determined using persona model determiner 266 or persona models generator 260.

For example, in some embodiments, features similarity identifier 264 may be used in conjunction with one or more pattern determiners 267 (a subcomponent of persona model determiner 266) to determine a set of user activity events that have in-common features. In some embodiments, this set of user activity events may be used as inputs to a pattern based predictor, as described below. In some embodiments, features similarity identifier 264 comprises functionality for determining similarity of periodic- and behavioral-based activity features. Periodic features comprise, for example, features that may occur periodically; for example, features on a day of the week or month, even/odd days (or weeks), monthly, yearly, every other day, every third day, etc. Behavior features may comprise behaviors such as user activities that tend to occur with certain locations or activities occurring before or after a given user activity event (or sequence of previous activity events), for example.

In embodiments where activity features have a value, similarity may be determined among different activity features having the same value or approximately the same value, based on the particular feature. (For example, a timestamp of a first activity happening at 9:01 AM on Friday and a timestamp of a second activity happening at 9:07 AM on Friday may be determined to have similar or in-common timestamp features.)

Persona model determiner 266 is generally responsible for determining one or more persona models for a legitimate user, which may include generating the persona model in a first instance, creating an additional persona model, or updating one or more existing persona models. Embodiments of persona model determiner 266 may utilize legitimate user-related information, including contextual information, information about user accounts and devices (which may be stored in user accounts and devices 242 of user profile 240) or information provided by third-party applications and services, and/or semantic information to assemble a collection or association of information that characterizes the legitimate user. Alternatively or in addition, some embodiments of persona model determiner 266 may receive portions of a persona model for the user from third-party applications and services; for instance, patterns of user-related activity may be received from a social media service, such as Facebook, or information about a restaurant frequently visited by the user may be provided by a location check-in service, such as Foursquare. As further described herein, the legitimate user-related information or portions of a persona model provided by third-party applications or services may be weighted when determining an authenticity score such that their influence on the score is diminished. In this way, an illegitimate user is unable to use a compromised or fake third-party application or service to appear legitimate. The persona models determined by persona model determiner 266 may be stored in and accessed from user persona models component 244 of a user profile 240 associated with the legitimate user, and in one embodiment take the form or a record or relational database of information.

In some embodiments, a user persona model includes one or more patterns of user-related activity associated with the legitimate user. Examples of such patterns may include, without limitation, user-related activity patterns based on time, location, content, or other context, as described herein, or patterns based on any activity-related features (or variables) such as those described in connection to activity features determiner 286. The patterns of user-related activity may be determined based on feature similarities identified in the legitimate user-related information and/or semantic information. In particular, some embodiments of persona models determiner 266 (or persona models generator 260 or one or more pattern determiners 267) may determine a user-related activity pattern based on repetitions of similar activity features associated with a plurality of observed user-related activity events. Thus for example, a pattern may be determined where activity features corresponding to two or more activity events are similar. Moreover, some embodiments of persona models determiner 266 or a pattern determiner 267 determine a pattern where each instance of a user activity event has corresponding historical values of tracked activity features (variables) that form the pattern(s), where pattern determiner 267 may evaluate the distribution of the tracked variables for determining the patterns. In some instances, an activity event may have many corresponding activity features (variables), which may be represented as a feature vector associated with a particular activity event. Accordingly, the analysis carried out by persona models determiner 266 or one or more pattern determiners 267 may involve comparing the activity features from features vectors of plurality of activity events.

In some embodiments, patterns of user-related activity may be determined by monitoring one or more activity features, as described previously. These monitored activity features may be determined from the user data described previously as tracked variables or as described in connection to user-data collection component 210. In some cases, the variables can represent context similarities and/or semantic similarities among multiple user actions (activity events). In this way, patterns may be identified by detecting variables or features in common over multiple user actions. More specifically, features associated with a first user action occurring during a user session by a legitimate user may be correlated with features of a second user action occurring during a user session by the legitimate user to determine a likely pattern. An identified feature pattern may become stronger (i.e., more likely or more predictable) the more often the user activity observations that make up the pattern are repeated. Similarly, specific features can become more strongly associated with a user activity pattern as they are repeated.

In some embodiments, the user persona models, or any activity patterns included in a persona model, may be determined using persona model logic 230. Persona model logic 230 may include rules, associations, conditions, prediction and/or classification sub-models, or pattern inference algorithms Thus, persona model logic 230 can take many different forms depending on a particular activity pattern or the mechanism used to identify an activity pattern, for instance, or identify feature similarity among observed activity events to determine a behavior pattern. For example, some embodiments of persona model logic 230 may employ machine learning mechanisms to determine feature similarity, or other statistical measures to determine the activity events belonging to a set of "example user actions" that support determining an activity pattern, as further described below.

In some embodiments, portions of persona model logic 230 may be included in (or associated with) the persona model for use when analyzing the persona model against contemporary user session data (i.e., user-related activity from a current user) to determine legitimacy of the current user, as reflected in an authenticity score. For example, persona model logic 230 included in the persona model may specify that certain legitimate user-related information provided by third-party applications and services should be weighted less than legitimate user-related information determined by the user-device being used by the current user, when determining the authenticity score. (For instance, where legitimate user-related information is provided from multiple third-party applications or services, persona model logic 230 may specify that the determined authenticity score should be whatever the lowest score would be if the score were to be determined based on any one of the services.) As another example, persona model logic 230 may include rules, conditions, or other logic, including the statistical processes for using the persona model to determine the authenticity score, which may be embodied as or reflect a statistical confidence of the legitimacy of the current user, as further described herein. Additionally, persona model logic 230 may include logic used for generating security challenges, such as specific types or categories of questions; logic specifying the criteria of legitimate user-related information to be used (e.g. the recency, type, category, such as user interactions, recent venues visited, browsing or app history, or the like); conditions for when to provide more than one security challenge or for monitoring user behavior concurrent with a security challenge (e.g., if the security challenge asks the user about recent calls and the user checks his or her call log, then a new security challenge should be provided); logic specifying how the authenticity score will be recomputed or updated based on correct or incorrect responses form the user, following a challenge, which may include whether to offer a second security challenge following an incorrect response; logic specifying types of security challenges to be presented and answered correctly in order to raise the authenticity score or in order to be granted access to various levels of sensitive information or secure applications and services; logic specifying a threshold or authenticity score value that is necessary in order to update the persona model or create a new persona model; or other logic that may be used for determining or utilizing the persona model.

In some embodiments, persona models determiner 266 or one or more pattern determiners 267 provides a pattern of user-related activity and an associated pattern-confidence weighting regarding the strength of the user pattern, which may reflect the likelihood that future user-related activity will follow the pattern. In this way, legitimacy of a future user may be determined based in part on the degree that the future user follows the pattern, with a stronger pattern being more likely to be followed, and thus a better indicator of user legitimacy (or illegitimacy, if the future activity is substantially different than the pattern). In some embodiments, the corresponding pattern-confidence weight may be determined regarding a determined user-related activity pattern. The pattern-confidence weight may be based on the strength of the pattern, which may be determined based on the number of observations (of a particular user-related activity event) used to determine a pattern, how frequently the user's actions r related activity is consistent with the activity pattern, the age or freshness of the activity observations, the number of similar features, types of features, and/or degree of similarity of the features in common with the activity observations that make up the pattern, or similar measurements.

In some instances, the pattern-confidence weighting may be reflected in the person a model and considered when evaluating legitimacy of a current user against a persona model when determining the authenticity score. For example, in some embodiments, a minimum pattern-confidence weight may be needed before using a particular activity pattern is used for evaluating against activity of a current user. Nevertheless, user-related activity still may be monitored and activity-related patterns updated based on additional activity observations, since the additional observations of may increase the pattern-confidence for a particular pattern.

Continuing with system 200 of FIG. 2, authenticity verification 290 is generally responsible determining legitimacy of a current user. In an embodiment, authenticity verification 290 determines an authenticity score for the current user, based on an analysis of activity-related information associated with the current user (contemporary user session data) and one or more persona models associated with a legitimate user. As described previously, an authenticity score may be embodied as a statistical probability representing the likelihood or degree of confidence that the current user is legitimate. As further described herein, in some embodiments, the authenticity score may be used by a PDA, or similar application or service or by a credentials management application or service, such as credentials manager 270, to control access to sensitive data or access to a secure application or service.

As shown in system 200, example authenticity verification 290 comprises an authenticity score determiner 292, security challenge generator 294, and security challenge evaluator 296. Authenticity score determiner 292 is generally responsible for computing an authenticity score for a current user. As used herein the term "current user" may refer to a human user, who may be currently engaged in a user session with a user device associated with the legitimate user or with an application or service associated with the legitimate user (such as email or a cloud-based service), either in person (i.e., the current user has physical control over the user device) or via remote access to the user device (or cloud-based application or service.) "Current user" also may refer to non-human conducted activity occurring on a user device or cloud-based application or service associated with the legitimate user, such as malicious activity carried out automatically by malware, adware, spyware, or other process carried out without consent by the legitimate user. User-related activity information from a current user may be monitored by user-related activity monitor 280 and stored in contemporary user session data 241, as part of a user profile 240.

In an embodiment, the authenticity score for a current user reflects a statistical similarity to or compatibility with a persona model for a legitimate user. For example, suppose a persona model specifies certain communication networks used by the legitimate user, a set of one or more user devices associated with the legitimate user, locations at certain times of day for the legitimate user (such as hubs, described herein), and patterns of browsing or application usage. An embodiment of authenticity score determiner 292 may conduct an analysis on user-related activity information for a current user to determine whether the current user is using one of the communication networks specified in the persona model, whether the current user is using one of the user devices identified in the persona model, whether the current user is at one of the frequented locations (i.e., hubs, identified in the persona model, and/or the degree of similarity between the current user's browsing or application usage and the patterns in the persona model. Based on that analysis, an authenticity score may be determined for the current user. In some embodiments, where the authenticity score is low, or if the current user requests access to a secure computing resource that requires a higher authenticity score in order to access, authenticity verification 290 (or security challenge generator 294) may determine a security challenge to present to the current user.

In some embodiments, an authenticity score may be determined based on a combination or one or more of: user-related activity or behavior pattern analysis; successful login efforts by the user (e.g. logging in to a device, an account, service, a password manager, a credentials vault, etc.); successfully supplying biometric credentials (e.g. fingerprint, eye-pattern, face recognition signal(s)); compliance with organization policies or rules that may be established by a system administrator; location, IP address, and/or network connection (such as an "on premise" network connection), which may be considered a user-related activity pattern in some instances; human-verification challenges (e.g., Captcha); or information received from third-party applications or services, which may be specified or authorized by the legitimate user, in some instances. In some embodiments, the contribution or input of each of these towards determine the authenticity score may be specified in the user settings or preferences 243, in persona model logic 230, or may be pre-determined based on an organization's (e.g., an employer's, school's or institution's) policy, such as a corporate policy or business rule. Further, in some embodiments, one or more of these inputs to determining an authenticity score may be weighted; for example, information from third-party applications or services may be weighted less than other inputs, in some instances, as described herein.

An authenticity confidence score (or authenticity score) may be determined in an ongoing or continuous manner, periodically, or as needed using various input user-data sensed, detected, or otherwise determined via the user device(s), as described herein. The current or most recent authenticity score determined by authenticity verification 290 (or authenticity score determiner 292) may be stored in a user profile associated with the user, such as in authenticity score 248 of user profile 240. In some embodiments, historical authenticity scores previously determined for the user also may be stored here. Further, in some embodiments, the authenticity score may diminish over time such as based on the freshness or recency of the user-related activity information for the current user. For instance, in an embodiment, after each interval of time (which may be a minute, several seconds, an hour, etc.) the authenticity score may be decreased. In this way, the user's legitimacy must be periodically or occasionally re-determined. (As described herein, the legitimacy may be determined or re-determined, for instance, based on an analysis of the current user's behavior verse a persona model for the legitimate user and/or based on the current user successfully responding to a security challenge.) In an embodiment, persona model logic 230 or a user setting or preference 243 may specify whether and/or how often to decrease the authenticity score. As a practical consequence of such embodiments, it may be the case that a particular user, who initially has an authenticity score high enough to have access to multiple secure computing resources, may after a period of time has expired, no longer have access to some of those secure computing resources because the authenticity score has dropped below a threshold required to access those secure computing resources. For example, suppose an email service (a secure computing resource) requires that the authenticity score satisfy a first threshold and a mobile banking application (another secure computing resource) requires that the authenticity score satisfy a second threshold, which is higher than the first threshold. A legitimate user may start a user session with an authenticity score high enough to have access to both her email account and mobile banking application. But in an embodiment where after a duration of time, if the authenticity score is not re-computed, it is decreased, after a period of time has passed, the user may no longer have access to her mobile banking application, which requires the higher authenticity score to access. But the user still may have access to her email account. In some instances, after additional time passes, without re-determining the authenticity score, the user's authenticity score may drop low enough that the user no longer has access to the email account. However, in many embodiments, the user's ongoing activity during a user session may be continuously or frequently evaluated against a persona model of a legitimate user, in order to determine or update the authenticity score. Therefore, in some embodiments the preceding example may only occur in situations such as where the user sets down (or walks away from) their user device and thus because the user is no longer using the device, as the period of time passes, the authenticity score may not be updated.

In one embodiment, the authenticity score is monitored by a personal digital assistant program (PDA), such as Microsoft Cortana®. PDAs that operate on a user device, across multiple user devices associated with a user, in the cloud, or a combination of these, are a newer technology that promises to improve user efficiency and provide personalized computing experiences. A PDA may provide some services traditionally provided by a human assistant. For example, a PDA may update a calendar, provide reminders, track activities, and perform other functions. Some PDAs can respond to voice commands and audibly communicate with users.

Security challenge generator 294 is generally responsible for generating security challenges to be provided to a current user when an authenticity score associated with the user is low (indicating possible illegitimacy) and/or when the current user attempts to access a secure computing resource that requires a higher authentic score for access than the user's current score. Security challenge evaluator 296 is generally responsible for evaluating the security challenges. In some embodiments, security challenge evaluator 296 provides information about the evaluation to authenticity score determiner 292 so that the authenticity score may be updated based on the result of the security challenge. Alternatively, security challenge evaluator 296 or another component of system 200 may update the authenticity score based on the result of the security challenge.

As described previously, in some embodiments, when the authenticity score indicates a current user may not be the legitimate user, such as when the score falls below a certain threshold, the user may be presented with a dynamic security challenge to validate legitimacy of the user. In embodiments, the threshold may be pre-determined by the user, application, or service, and may vary according to the sensitivity level of information or services being accessed. For instance, accessing email may require a lower threshold (and thus have a lower pre-determined threshold) than accessing a mobile banking application. The security challenges may be generated by generator 294 and evaluated by evaluator 296, each of which may components of a PDA or other application or computer service running on the user computing device(s) or in the cloud, which may also manage access to the user's sensitive information.

In an embodiment, security challenge generator 294 may determine a security challenge using information derived from one or more user persona models associated with the legitimate user or directly from user-related activity information obtained during user sessions wherein the authenticity score is sufficiently high, such as above a threshold indicating that it is very likely that the current user is the legitimate user. A security challenge may comprise interrogating the current user, such as presenting the user with one or more questions derived from information about the legitimate user. For instance, a security challenge may ask the user to name the contact that the user called the most during the last three days. Another security challenge may ask the user "which sushi place did you visit last week?" Yet another security challenge may ask the user how far they ran during their last workout or what the weather was like. In some embodiments that comprise a platform for use with third-party computer services and applications, an example security challenge may ask the user about a social media post that they liked or responded to. For instance, using a Twitter sentiment analysis (which may be determined as interpretive data), a security challenge may ask the user "how did you feel after the sports match between X team and Y team?" In this way, a security challenge may be temporal as well as dynamic.

It is also contemplated that a security challenge may request the user to provide biometric information or conventional passwords, RSA token, Captcha, multifactor authentication, a code from an internal site or admin user, Microsoft Passport or Windows Hello, or other identifying information, in some embodiments (or that security challenges may be a mix of this and temporal or dynamic challenges described above). For instance, some corporate security policies may require users to provide a password and RSA token number, or may contact the user via a second user device to verify legitimacy. In some of these embodiments, the user's response here may be evaluated and used to update the authenticity score. Thus, for example, a current user's failing to correctly enter a password and RSA token for access to a corporate VPN may result in a lower authenticity score that subsequently prevents the current user from accessing a social media account, which is unrelated to the corporate VPN. The security challenges generated by security challenge generator 294, which may include question-answer pairs or other challenges described herein, may be stored in a user profile associated with the user, such as in security challenge question-answer pairs 246 of user profile 240.

In some embodiments user-related activity monitor 280 may monitor the user to determine if the user is checking call logs or other user-history on the user device in order to correctly answer the security challenge. Where this type of cheating activity is detected, a different security challenge may be presented, or the authenticity score may simply be lowered, thereby blocking (or restricting) the current user from access to sensitive information. Additionally, such monitoring for cheating may occur across multiple user devices.

As described previously, a persona model may include or be associated with persona model logic 230, in some embodiments. Persona model logic 230 may be used by security challenge generator 294 to generate security challenges and/or by security challenge evaluator 296 to evaluate the current user's response to the security challenges, and also may include logic for when to provide additional security challenges. Although this logic is referred to herein as "persona model logic" it is contemplated that the logic may be used for determining an authentication score and/or for generating or evaluating security challenges. It is also contemplated that some embodiments may utilize the same set of persona model logic 230 for all persona models (or for more than one persona model). Additionally or alternatively, it is contemplated that some embodiments, which may not use a persona model specific to each legitimate user, may instead determine legitimacy of a current user (by determining an authenticity score) based on an analysis of user-related information about the current user (or contemporary user session data 241) using persona model logic 230. In such embodiments, persona model logic 230 includes a set of rules, conditions, and/or associations for evaluating the contemporary user session data to determine legitimacy, and may also use persona model logic 230 for generating or evaluating security challenges.

In some embodiments, persona model logic 230 includes logic specifying how the authenticity score will be recomputed or updated based on correct or incorrect responses form the user, following a challenge, such as how much higher or lower should the score be adjusted. For example, suppose the authenticity score ranges from 0 to 100, with higher score corresponding to a higher confidence or statistical probability that the current user is legitimate. In one such embodiment, each correct response to a security challenge may boost the confidence score by a certain level (e.g. by 10), which may be specified by the persona model logic 230. In another embodiment, a correct response may increase the score to satisfy a certain threshold in order to access particular secure computing resources requiring an authenticity score at or above that certain threshold in order to be accessed. Thus, for example, if a first secure computing resource, such as email, is associated with a lower authenticity level threshold and a second secure computing resource such as a financial service has is associated with a higher threshold, a correct response to a security challenge may boost the authenticity score enough to satisfy the lower threshold, but not the higher threshold. Thus the current user may be granted access to the email application but not the financial service. In order the access the financial service, the current user may be required to successfully respond to another security challenge (or multiple additional security challenges). As described previously, the persona model logic 230 may include logic for whether to provide the current user with a second (or additional) security challenge following an incorrect response; logic specifying types of security challenges to be presented and answered correctly in order to raise the authenticity score or in order to be granted access to various levels of sensitive information or secure applications and services; logic specifying a threshold or authenticity score value that is necessary in order to update the persona model or create a new persona model; or other logic that may be used for determining or utilizing the persona model, or for generating or evaluating security challenges.

Continuing with system 200 of FIG. 2, credentials manager 270 is generally responsible for managing user-access to credentials, other sensitive information and/or other secure computing resources associated with a legitimate user. By way of example and not limitation, such sensitive data may include financial data, medical or health-related data, insurance data, employment data, other information generally recognized as sensitive, personally identifiable information, private information including information designated by the user as private, user credentials (e.g., passwords, usernames, account numbers, or other information that may be used for identifying of verifying a user), user account information, which may include login credentials, or any other information associated with a user that could be valuable to hackers or an illegitimate user. The credentials may be used for accessing a user device, network, secure application or service, or user account associated with a secure application or service, such as email, computer services such as Office365® by Microsoft, social media accounts, bank, credit card, or payment accounts (e.g., PayPal), other type of accounts associated with the user, such as utilities (e.g., water, electricity, gas), entertainment (e.g., cable, Netflix®, XBoxLive, Amazon®), travel, rewards, or discount programs (e.g., frequent flyer accounts, rental car accounts, shopper clubs, etc.) app accounts (e.g., Uber accounts, Ebay, YouTube, or other secure computing resource.

In an embodiment, the credentials or sensitive information is stored in a credentials vault (or secure memory or cache) associated with the legitimate user, such as credentials vault 249 of user profile 240, which may be stored securely in the cloud, on one or more user devices, or a combination of the cloud and user device(s). A credentials vault 249 may be managed by a PDA or other application or service and may facilitate access to sensitive information in the vault based on the authenticity score or degree of confidence that the current user is legitimate. Because it is contemplated in some embodiments that access to certain credentials or sensitive information may require a higher authenticity score (or higher confidence that the user is legitimate), credentials manager 270 may allow access to only portions of sensitive information in a credentials vault, but not necessarily all of the information, depending on the authenticity score. For example, a lower authenticity score maybe sufficient to access the credentials associated with an email service, but insufficient to access the credentials for a banking application. Thus, in some embodiments, the credentials manager 270 manages a cache of credentials for these various scenarios, and access is proportional to a level of confidence about the legitimacy of the current user.

In some embodiments, where the authenticity score satisfies a threshold or specified level for accessing sensitive information, credentials manager 270 (or a similar application or service as part of a PDA, for instance) may facilitate fetching, creating, deleting, updating, or otherwise modifying credentials on demand. Moreover, one embodiment comprises a user interface for accessing sensitive information in the credentials vault 249 in a secure manner. For example, a secure user interface may be provided by presentation component 220 to facilitate enabling a legitimate user to store, fetch, or modify credentials in a secure way.

In embodiments wherein the sensitive information or credentials vault 249 is stored in the cloud, credentials manager 270 may facilitate access directly by the secure computing resource, which may include third-party applications of services, without necessarily requiring transmission of the credentials to a user device first and then to the secure computing resource. In other words, in some instances, it may be unnecessary for a user to first access his or her credentials vault 249, retrieve sensitive information, and then provide that sensitive information to a secure computing resource, such as a mobile banking application. Instead, credentials may be provided directly to the secure computing resource from the credentials vault 249 by credentials manager 270 or access may be facilitated automatically by credentials manager 270. Moreover, in some embodiments, rather than (or in addition to) a credentials manager 270 facilitating access to sensitive information when the authenticity score is sufficiently high (e.g., when it satisfies a threshold associated with a secure computing resource being accessed), credentials manager 270 (or a similar application or service as part of a PDA, for instance) may vouch for the legitimacy of the user or otherwise stand in place for legitimate user's credentials. For example, in one embodiment, credentials manager 270 may provide verification information to a third-party application or service conveying that the user is legitimate. Such an embodiment can reduce or eliminate the need to expose the legitimate user's credentials or other sensitive information, which decreases the risk for stealing or hacking the credentials.

Example system 200 also includes a presentation component 220 that is generally responsible for presenting content and related information to a user. For example, presentation component 220 may facilitate presenting aspects of or content associated with secure computing resources, such as application or services, which may include third-party applications or services; content associated with a security challenge, and in some instances a user interface for receiving a user response to a security challenge; a secure user interface for facilitating access to sensitive information or credentials vault 249; user preferences or settings 243; and/or aspects of a persona model, such as activity patterns, or other user-related information stored in or associated with a persona model. For example, in one embodiment, presentation component 220 facilitates user access to Cortana's Notebook, for accessing information preserved about the legitimate user.

Presentation component 220 may comprise one or more applications or services on a user device, across multiple user devices, or in the cloud. For example, in one embodiment, presentation component 220 manages the presentation of content to a user across multiple user devices associated with that user. Presentation component 220 may determine on which user device(s) content is presented, as well as the context of the presentation, such as how (or in what format and how much content, which can be dependent on the user device or context) it is presented, when it is presented, etc. In some embodiments, presentation component 220 generates user interface features associated with content personalized to the user. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In one embodiment, presentation component 220 may present an indication of the legitimacy of a current user, such as the current authenticity score or an indicator (such as a color or symbol) indicating legitimacy (or illegitimacy) or even the degree of confidence that the user is legitimate. This could deter an illegitimate user from repeated attempts to access sensitive information or may provide an indication to a legitimate user that he or she may be doing something suspicious, unrecognized, or contrary to one or their persona models. This may prompt a legitimate user to either modify their behavior (or remind them that if they continue, they will need to satisfy a security challenge or otherwise increase their authenticity score) or consider updating their persona model, which may be updated automatically to consider the new behavior, in some embodiments, where the authenticity score is sufficiently high.

As shown in example system 200, storage 225 includes persona model logic 230, as described previously, and user profiles 240. One example embodiment of a user profile 240 is illustratively provided in FIG. 2. Example user profile 240 includes information associated with a particular user such as information about user account(s) and device(s) 242, user settings or preferences 243, user persona model(s) 244, security challenge question-answer pairs 246, authenticity score 248, and credentials vault 249. Example user profile 240 also includes information potentially associated with a particular user, such as contemporary user session data 241. The information stored in user profile 240 may be available to persona models generator 260, authenticity verification 290, credentials manager 270, or other components of example system 200.

As described previously, contemporary user session data 241 generally includes user-related activity information associated with a current user. The information stored in contemporary user session data 241 may be used by authentication verification 290 to determine an authenticity score for the current user such as by comparison to one or more persona models associated with a legitimate user. User account(s) and device(s) 242 generally includes information about user devices accessed, used, or otherwise associated with a the legitimate user, and/or information related to user accounts associated with the legitimate user; for example, online or cloud-based accounts (e.g. email, social media) such as a Microsoft® Net passport, other accounts such as entertainment or gaming-related accounts (e.g. Xbox live, Netflix, online game subscription accounts, etc.) user data relating to such accounts such as user emails, texts, instant messages, calls, other communications, and other content; social network accounts and data, such as news feeds; online activity; and calendars, appointments, application data, other user accounts, or the like. Some embodiments of user account(s) and device(s) 242 may store information across one or more databases, knowledge graphs, or data structures. As described previously, the information stored in user account(s) and device(s) 242 may be determined from user-data collection component 210 or user-related activity monitor 280 (including one its subcomponents).

User settings or preferences 243 generally includes user settings or preferences associated with user-related activity monitoring; determining persona models (which may include information to be included or excluded from a persona model); determining authenticity scores (which may include settings specifying information to be considered when computing an authentication score), which may include permission for using information for designated third-party applications or services and/or weighting to be applied to this information; settings or preferences regarding generating, presenting, and/or evaluating security challenges; or other options associated with functions of the embodiments described herein. In some embodiments, user settings or preferences 243 may include user preferences about specific user-related activities (and related information) that the user desires be explicitly monitored or not monitored or categories of activities to be monitored or not monitored, crowdsourcing preferences, such as whether to use crowd sourced information, or whether the user's activity pattern information may be shared as crowdsourcing data; settings regarding thresholds; and/or notification preferences, for example. Furthermore, as described herein, user settings or preferences 243 may also specify thresholds or minimum authenticity scores (or a minimum degree of confidence about the legitimacy of a current user) for accessing certain classes of sensitive information or other secure computing resources.

User persona model(s) 244 includes the one or more persona models for with the legitimate user associated with user profile 240, as described previously. Security challenge question-answer pairs 246 generally includes question-answer pairs (or information used for providing question-answer pairs) or other security challenges described herein. Authenticity score 248 generally includes a current or most recent authenticity score for the user associated with user profile 240, which may be determined by authenticity verification 290 or authenticity score determiner 292. In some embodiments, historical authenticity scores previously determined for the user also may be stored in authenticity score 248. Credentials vault 249 generally includes credentials or sensitive information associated with the user, as described previously.

As described previously, aspects of the technology described herein may be implemented using a personal digital assistant program, such as Microsoft Cortana®, or other application, service, which may operate on a user computing device ("user device), across a plurality of user devices, and/or as a distributed application or service in the cloud. Aspects of the technology described herein may also be embodied as part of the user device operating system (or cloud-based operating system) and/or as a platform. For instance, a platform may be provided for use with third-party computer services and applications, such as, by way of example and not limitation, Facebook, Uber, Netflix, Xbox Live, or Amazon, which may interface with aspects of the authentication mechanisms described herein to determine legitimacy of the user seeking to access the third-party applications or services. In this way, a current user determined to be legitimate may avoid needing to separately log onto these applications or services. Moreover, in such circumstances where user legitimacy is likely, a personal assistant application or service may interface with a third-party application or service to carry out an operation on behalf of the user. For example, the user might ask her personal digital assistant, "Cortana, get me an Uber for my two-o'clock meeting today." Upon a determination that the current user is likely legitimate, or where the monitored authenticity score is sufficiently high enough to indicate the current user is probably legitimate, the PDA may initiate a communication with the Uber service, automatically provide access to Uber of information from the user's credentials vault regarding Uber account information and login information, and schedule the Uber ride so that the user can arrive in time for her 2:00 pm meeting.

Further, in some embodiments, the platform may be utilized by third-party applications and services for providing information used to verify the current user's legitimacy. In particular, aspects of a user persona model or user-related activity information determined by the third-party application or service may be provided. For example, if the current user of a user device has recently logged into Facebook successfully on the user device, then Facebook may provide user-related activity information, which may include an indication that the current user logged in successfully. Thus the login credentials supplied by the current user may be used as an input into the authenticity mechanism of some embodiments of the technologies described herein. In particular, the authenticity score of the user may be increased to reflect that the current user is more likely to be legitimate because of the successful login to the legitimate user's Facebook account.

It is worth noting, however, that while the user's authenticity score may be increased, it may nevertheless not be increased enough for the current user to be provided access to all of the legitimate user's sensitive information or secure applications, services or other computing resources. For instance, following the previous example of logging into Facebook, further verification of the current user still may be necessary, in order for the current user to conduct mobile banking. But the increased authenticity score may be sufficient for the current user to access another application or service that may be at the same security level as Facebook®, such as Instagram® for example. Where further verification of the user is needed, it may be obtained using an embodiment of the verification procedure described herein, such as my comparing the current user-related activity information with a persona of the legitimate user, and/or providing one or more security challenges to the current user.

In some embodiments, the user-related activity information provided by third-party applications or services, via an embodiment of the platform described herein, may include aspects of a user persona model for the legitimate user. For instance, Facebook may provide information about recent user-related activity such as user posts or events. Similarly, Uber may provide information about recent rides completed by the user. This information may be utilized by an embodiment of the invention for generating security challenges, such as question-answer pairs. For example, a user may be asked, "To what location did you ride an Uber last Saturday evening?"

Additionally, because the potential exists for the third-party applications or services to be hacked, under the control of an illegitimate user, or otherwise insecure, some embodiments, as further described herein, apply a weighting to an authenticity score determined from authenticity verification information provided by these applications and services. In this way, an illegitimate user is unable to use a fake (or otherwise compromised) third party application or service to indicate legitimacy (such as by providing an indication that the current user successfully logged in or providing phony user-related activity information to be used for generating a security challenge to the current user. Moreover, an illegitimate user is unable to use a plurality of fake third-party applications or services to boost his or her authenticity score.

In an embodiment, the authenticity score determined from authenticity verification information provided by all third party applications and services is determined as the lowest score for any one of the third party applications and services. Thus, while according to some embodiments a higher authenticity score (i.e., greater likelihood that the user is legitimate) would typically result where a user successfully answers a security challenges and successfully logs in to multiple secure applications or services, when the authenticity score is based on authenticity verification information provided by one or more third-party services, rather than being cumulative (i.e., increasing the score) upon each successful log-in, successful answer to security challenge, etc., the lowest authenticity score, derived from any one of the third-party provided authenticity verification information, may be determined for the user. Alternatively, in another embodiment, an authenticity score determine using third-party derived authenticity verification information may be capped or have a ceiling, such that the score cannot exceed a certain level without further verification of the user, which may be based on other authenticity verification information not provided by a third-party application or service. In some embodiments, the weighting or ceiling may be pre-determined, such as a default security setting (or settings), so that access to the more sensitive information or more secure applications and service (e.g., banking/financial services, posting to social media, etc.) are restricted. Further, in some embodiments, the weighting or ceiling level(s) can be set or modified according to user settings or preferences, which may be modified only when the authenticity score is sufficiently high enough, in some embodiments (indicating high confidence that the current user is legitimate).

With reference now to FIG. 3, aspects of an example system for determining personalized user-authentication and controlling access to secure computing resources is provided and referenced generally as system 300. Example system 300 depicts an embodiment of a user authentication system implemented as part of a virtual personal assistant 350, which may be embodied as a PDA or an application or service operating on one or more user devices or in the cloud, such as described in connection to FIG. 2. In one embodiment, the virtual personal assistant is Microsoft Cortana. As shown in example system 300, virtual personal assistant 350 includes a behavior analyzer/authentication score calculator 390, security questions and answers generator 394, and credentials manager 370.

Embodiments of virtual personal assistant 350, or its subcomponents, may determine an authenticity a user based on user-related information provided from one or more sources, such as information derived from one or more client devices or user devices 312 associated with a user, which may also include information derived from a cloud-based application or service; information from third-party applications or services 318 (which may comprise approved sources permitted by the legitimate user to provide legitimate user information and which may be weighted, as described in connection to FIG. 2); other information about the user 316, which may include credentials supplied by the user; information from an organization or system administrator associated with the legitimate user (such as communication network information (e.g., domain/IP address/on-premises network information)); or other sources of user-related information (not shown). Embodiments of behavior analyzer/authentication score calculator 390 may analyze the behavior of a user, using the information associated with 312, 314, 316, and 318 and determine an authentication score or measure of confidence that the user is legitimate (which may be embodied as an authenticity score) such as described in connection to system 200 in FIG. 2.

Security questions and answers generator 394 is generally responsible for determining security questions or challenges to be provided to a current user in order to determine legitimacy of the user, when the authentication score indicates the current user may not be legitimate. For instance, a low authentication score may reflect a statistical confidence that the current user is legitimate is not sufficiently high enough for the current user to have access to a secure computing resource or sensitive information. Security questions and answers generator 394 may receive input from third-party applications or services 397, such as information about recent user-related activity, and which may be weighted (such as described in connection to FIG. 2). Security questions and answers generator 394 may also receive information 395 from a system administrator or organization associated with the legitimate user, such as business rules, policies, etc., such as described in connection to FIG. 2. In an embodiment, a system administrator may specify the format or types of security questions to be generated and provided to the user.

Some embodiments of security questions and answers generator 394 may include functionality described in connection to security challenge generator 294 in FIG. 2. A user response to security questions or challenges provided from security questions and answers generator 394 may be evaluated by behavior analyzer/authentication score calculator 390. Thus, some embodiments of behavior analyzer/authentication score calculator 390 include functionality described in connection to authenticity verification 290 and may further include some of the functionality described in connection to persona models generator 260, each described in connection to FIG. 2, (such as functionality related to behavior analysis, which may include behavior-pattern analysis.)

Credentials manager 370 is generally responsible for managing user-access 375 to credentials, other sensitive information and/or other secure computing resources 349 associated with a legitimate user. Secure computing resources 349 may comprise a secure application or service (such as a bank website or mobile banking application, social media account, email, purchase account, etc.), a credentials vault, or sensitive information about the legitimate user. In some embodiments, credentials manager 370 operates on top of a credentials vault and performs a log-in and integration process or otherwise controls access to the sensitive information in the vault. In some embodiments, credentials manager 370 includes the functionality described in connection to credentials manager 270 of system 200 in FIG. 2.

Figure 4:
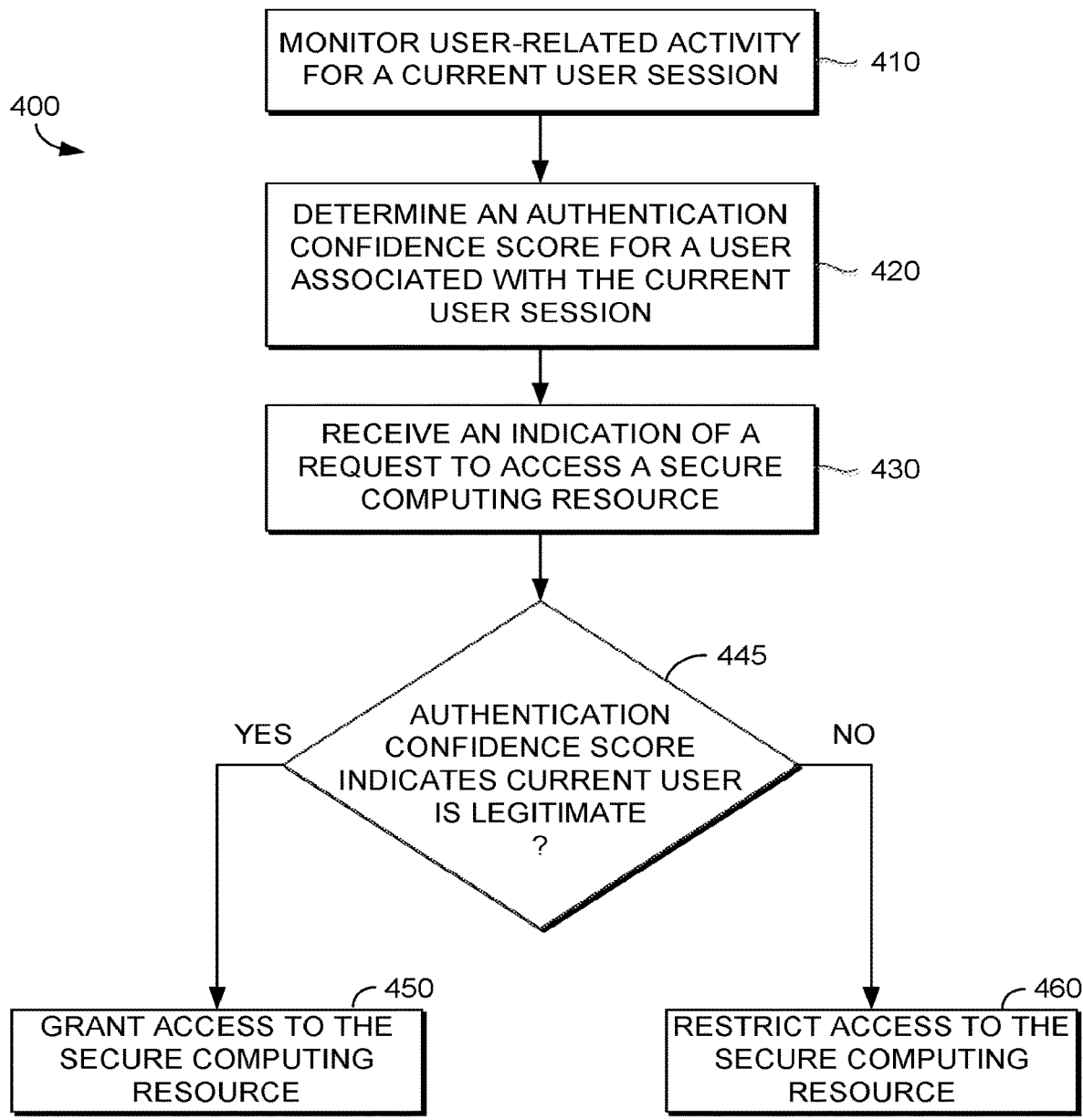
FIG. 4 depicts a flow diagram of a method for granting access to a secure computing resource based on a measure of legitimacy determined for a current user, in accordance with an embodiment of the present disclosure.

Turning to FIG. 4, a flow diagram is provided illustrating one example method 400 for granting access to a secure computing resource based on a measure of legitimacy determined for a current user. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 400 may be performed by one or more computing devices, such as a smart phone or other user device, a server, by a distributed computing platform, such as in the cloud, or other computing device such as computing 600, described in connection to FIG. 6. A measure of legitimacy for a current user may be determined through an analysis of signal data (or user data) gathered from one or more user devices associated with the current user and legitimate user (which may be the same user, where the current user is legitimate).

At step 410, monitor user-related activity for a current user session. Embodiments of step 410 may monitor one or more user devices associated with a legitimate user to determine a current user session. A current user session may comprise contemporary user-related activity, which may occur for an instant or over a duration of time, on (or associated with) a user device or other computer resource (such as a cloud-based resource) associated with a legitimate user. For example, user interactions (or other user-related activity) occurring on a user device, such as a smart phone, belonging to a legitimate user may be monitored for a current user session. The user-related activity may be monitored in order to gather observations about current user-related activity for a comparison against a set of information associated with the legitimate user of the user device or computer resource. In an embodiment the set of information about the legitimate user comprises one or more persona models, such as described in connection to system 200 of FIG. 2. Some embodiments of step 410 may be carried out using a user-related activity monitor 280, such as described in system 200 of FIG. 2. Additionally, some embodiments of step 410 may store the monitored user-related activity for a current user session in contemporary session data 241 of a user profile 240, such as described in system 200 of FIG. 2.

At step 420, determine an authentication confidence score for a user associated with the current user session. Embodiments of step 420 determine an authentication score for a user, or in some instances for the user-related activity, associated with the current user session. In particular, it is contemplated that in some instances a user associated with the current user session may not exist, such as the situation where activity is carried out by an illegitimate automated process (such as a malware routine or other unauthorized automated activity). Thus, although step 420 determines an authentication confidence score for a user, the term "user" in regards to method 400, is intended to be broad and to include non-human use or activity that may originate from automated processes.

In an embodiment, step 420 comprises determining an authentication confidence score based on a comparison of information from the monitored user-related activity and a persona model corresponding to a legitimate user associated with the user device or computer resource. The authentication score may comprise an authenticity score, in an embodiment, and may be determined as described in connection to authentication verification 290 of system 200 in FIG. 2. Additionally, a persona model for the legitimate user may be accessed from a user profile associated with the legitimate user, such as user profile 240, and the persona model determined according to the description of persona model generator 260 of system 200, for example, by using user-related activity information of the legitimate user. Moreover, some embodiments of step 420 may be carried out by an authenticity verification component or routine, such as authenticity verification 290 of system 200, described in connection to FIG. 2.

At step 430, an indication is received of a request to access a secure computing resource. As described previously, a secure computing resource may comprise sensitive information about the legitimate user, which may include credentials, security settings or preferences, and in some cases a persona model for the legitimate user, and/or other secure computing applications or computing services, which may include third-party applications or services. For example, in one embodiment of step 430 upon a current user attempting to access a secure computing resource, such as an email account or mobile banking application, an indication is received. The indication may be received by a PDA, or authentication-related application or service operating on the user device or in the cloud. For example, in one embodiment, as user-related activity of the current user is monitored, upon detecting that the user is attempting to access (or determining the user desires to access, or has taken any action in order to facilitate access) the secure computing resource, an indication is provided by a user-related activity monitor, such as user-related activity monitor 280 of system 200, described in connection to FIG. 2. In some embodiments, the indication comprises a signal, flag, code, designation, or similar information, which may be communicated to a PDA, credentials monitor, or other application or service, indicating a request to access a secure computing resource, and in some embodiments also indicating the particular secure computing resource for which access is requested. For instance, suppose the current user launches a mobile banking application on a smart phone device, embodiments of step 430 may detect that the mobile banking application is starting, determine that the mobile banking application is a secure computing resource (for instance, it may be designated as such in user settings, persona model logic, by default, or it may be determined to be secure upon detecting that the banking application is requesting credentials from the user), and may issue or otherwise provide an indication that the user is attempting to access a secure computing resource.

At step 445, the authentication confidence score is evaluated to determine whether it indicates the current user is legitimate. Embodiments of step 445 evaluate the authentication score to determine a degree of legitimacy for the current user. In an embodiment of step 445, the authentication score is compared against a threshold corresponding to a sufficient confidence of legitimacy. If the threshold is satisfied, then the current user is determined to be legitimate, but if the threshold is not satisfied, then the current user is determined to be illegitimate. The threshold may be pre-determined and may be specified by the legitimate user, such as a in a setting or preference, or may correspond to the particular secure computing resource (from step 430) that the current user is attempting to access. In some embodiments, different thresholds may exist for different secure computing resources, enabling some such resources to be accessed with a lower confidence of legitimacy and other resources to require very high confidence of legitimacy. Some embodiments of step 445 may be carried out by an authenticity verification component or routine, such as authenticity verification 290 of system 200, described in connection to FIG. 2.

At step 450, if the determined authentication confidence score indicates the current user is likely the legitimate user, then the current user is granted access to the secure computing resource. Alternatively, at step 460, if the determined authentication confidence score does not indicate that the current user is likely to be the legitimate user, then access to the secure computing resource is restricted. Embodiments of steps 450 and 460 control access to the secure computing resource based on the determined legitimacy of the current user. In an embodiment, access is controlled or managed by a credentials manager, such as credentials manager 270 of system 200, described in connection to FIG. 2. Thus in one embodiment, step 450 may be carried out by credentials manager 270 of system 200.

In some embodiments of method 400, where the authentication confidence score does not indicate that the current user is likely to be the legitimate user, a security challenge may be provided to the current user and the authentication score boosted (i.e., increased confidence of legitimacy) upon a correct response to the security challenge. Examples embodiments of providing and evaluating security challenges are described in connection to authentication verification 290 of system 200.

Figure 5:
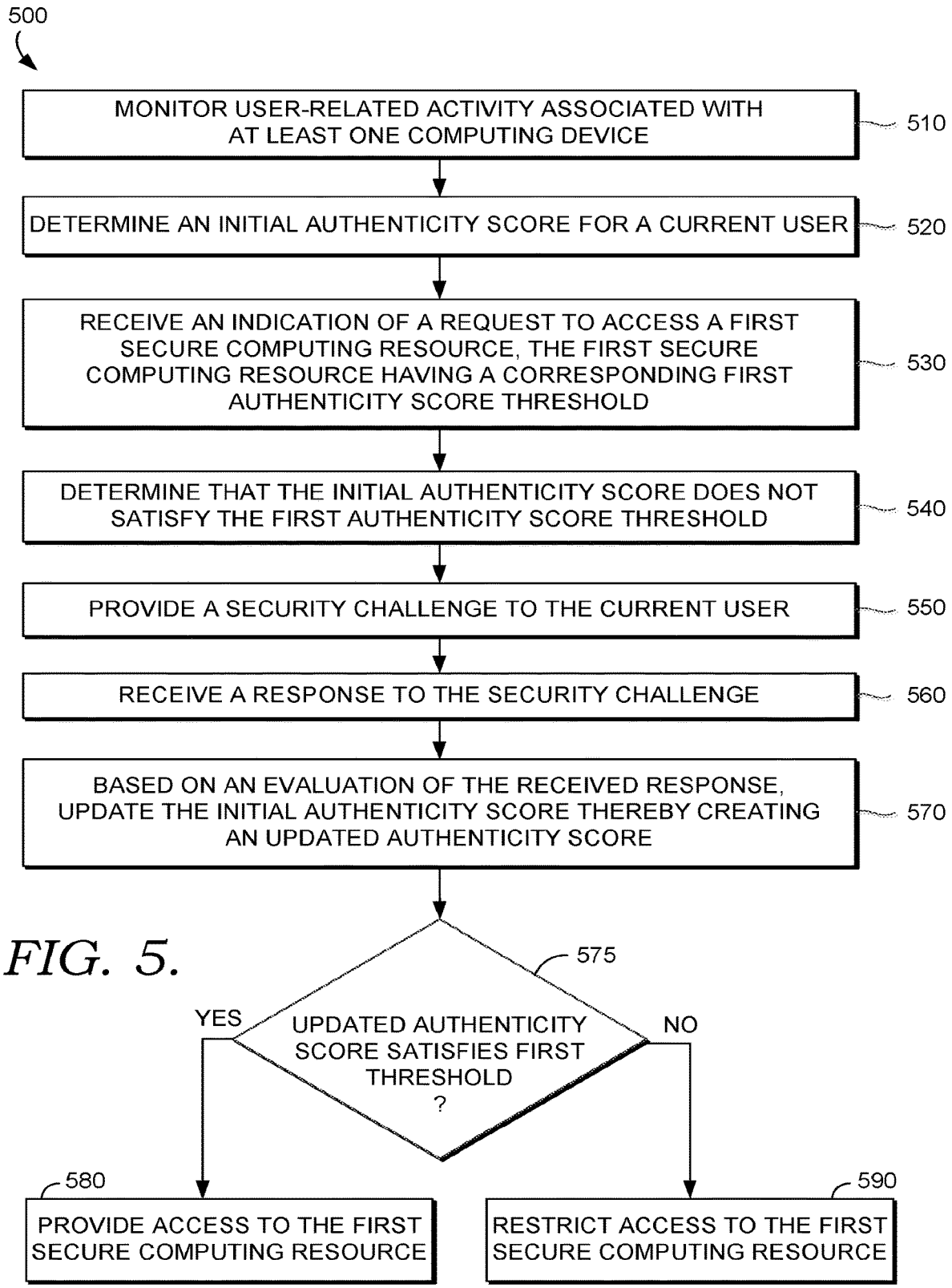
FIG. 5 depicts a flow diagram of a method for providing access to secure computing resources, in accordance with an embodiment of the present disclosure.

With reference now to FIG. 5, a flow diagram is provided illustrating an example method 500 for providing access to secure computing resources. At step 510, monitor user-related activity associated with at least one computing device. Embodiments of step 510 may monitor user-related activity during a current user session. The user-related activity may be associated with one or more computing devices, such as one or more user devices and/or servers, or a combination of user devices and servers. Thus in some embodiments of step 510, user-related activity is monitored across multiple computing devices. The at least one computing device may be associated with a legitimate user, such as a smart phone belonging to the legitimate user or a cloud-based service, such as an online application, for instance, operating at least in part on a server, the cloud-based service associated with the legitimate user. The user-related activity may be monitored by a user-related activity monitor 280 of system 200, described in connection to FIG. 2, and monitored user-related data may be stored in a contemporary user session data store associated with a user profile, such as contemporary user session data 241 of user profile 240, also described in connection to FIG. 2. Some embodiments of step 510 may be carried out as described in step 410 of method 400 (FIG. 4).

At step 520, determine an initial authenticity score for a current user. Embodiments of step 520 may comprise determining an authenticity score for a current user associated with a current user session. As described herein, in some embodiments an authenticity score is determined based on a comparison of the monitored user-related activity from the current user and information from one or more persona models associated with a legitimate user of the at least one computing device. In an embodiment, the initial authenticity score is determined by an authentication verification component 290, such as described in system 200, in connection to FIG. 2. Some embodiments of step 520 may be carried out as described in step 420 of method 400 (FIG. 4), wherein the initial authenticity score is determined as the authentication confidence score of method 400.

At step 530, an indication of a request to access a first secure computing resource is received. In embodiments of step 530, the first computing resource has a corresponding threshold specifying a value or condition that the authenticity score must satisfy in order for a user associated with that authenticity score to be permitted to access to the first secure computing resource. For example, the secure computing resource may have a specified threshold representing a minimum degree or measure of confidence that the user requesting access is legitimate or authorized. As described herein, the threshold may be pre-determined based on the particular secure computing resource, by the legitimate user, by a system administrator or organization associated with the legitimate user, or by a third-party application or service. In some embodiments, the threshold may be specified within user settings or preferences (such as user settings/preferences 243 of user profile 240, described in FIG. 2) or a persona model for the legitimate user (or persona model logic 230 associated with a persona model). Moreover, as described herein, it is contemplated that different secure computing resources may have different corresponding authenticity score thresholds. For instance, an email account may have a threshold requiring a lower confidence that the user is legitimate than a mobile banking application, which may have a threshold that requires a high confidence of user legitimacy. Some embodiments of step 530 may be carried out as described in step 30 of method 400 (FIG. 4), such as the description for how an indication of a request is determined.

At step 540, determine that the initial authenticity score does not satisfy the first authenticity score threshold. Embodiments of step 540 compare the initial authenticity score to the first authenticity score threshold and determine that the initial score does not satisfy the first threshold. For example, where the authenticity score is represented as a number, it may be that the number or value of the initial authenticity score is below a minimum score specified by the threshold (e.g., if the first threshold specifies a score of at least 80, and the initial score is 70, then it is determined that the initial score does not satisfy the first threshold.) Some embodiments of step 540 may be performed by credentials manager 270 or authentication verification 290, each described in system 200 in connection to FIG. 2. Additional details of some embodiments of step 540 are described in connection to credentials manager 270 or authentication verification 290.

At step 550, a security challenge is provided to the current user. As described herein, the security challenge may comprise a question or challenge presented to the current user in order to distinguish an illegitimate user from a legitimate one. For example, a non-question challenge may include prompting the user to provide credentials, s biometric, or other means of identity verification. In some embodiments, the security challenge may comprise a plurality of questions and/or challenges provided to the current user. Embodiment of step 550 may be carried out by a security challenge generator 294 or authentication verification 290, as described in system 200 in connection to FIG. 2. In some embodiments, step 550 comprises generating a security challenge based on information associated with a legitimate user of the at least one computing device, which may be derived from one or more persona models associated the legitimate user; rules, policies, or other information provided by a system administrator associated with the legitimate user, or an authorized third-party application or service associated with the legitimate user. (In some embodiments, it is contemplated that a persona model may include this information from a system administrator or authorized third-party application or service, as described herein.) In some embodiments, the security challenge may be determined (and in some instances, evaluated) using persona model logic 230, by the first secure computing resource, and/or may be specified by a system administrator. The security challenge may be provided to the current user via an aspect of presentation component 220, and the current user's response received via an aspect of user-data collection component 210, each also described in system 200. Additional details regarding security challenges that may be provided in embodiments of step 550 (and revived in step 560, and evaluated in step 570) are provided in connection to authentication verification 290 in system 200.

At step 560, a response to the security challenge provided in step 550 is received. Embodiment of step 560 may be carried out by a security challenge evaluator 296 or authentication verification 290, as described in system 200 in connection to FIG. 2. The response may be received from the current user. In some embodiments of step 510, the response may be received via a user-data collection component 210 or user-related activity monitor 280, such as described in system 200. Further, as described above in step 410, it is contemplated that in some situations a current user is not necessarily human, but may be an automated process carried out on a computing device. Thus the term "current user" is used broadly in method 500, as it is in method 400. Accordingly, it is contemplated that in some situations an automated process may provide the response to the security challenge received in step 560.

At step 570, based on an evaluation of the received response, update the initial authenticity score thereby creating an updated authenticity score. Embodiments of step 570 evaluate the received response to the security challenge and modify the authenticity score accordingly. The response to the security challenge may be evaluated by a security challenge evaluator 296, as described in system 200, in connection to FIG. 2, and the updated authenticity score determined by an authenticity score determiner 292, also described in system 200. For example, as described previously, if the response to the security challenge is correct, then the initial authenticity score may be boosted or otherwise modified to reflect an increased confidence that the current user is legitimate. However, if the response is evaluated to be incorrect, then the initial authenticity score may be decreased or otherwise modified to reflect a decreased confidence that the current user is legitimate. In some embodiments, persona model logic 230 may specify how to evaluate a security challenge and/or how to update the authentication score based on a correct or incorrect response, as described herein. In some embodiments, the security challenge and answers, which may be generated by security challenge generator 294 (of system 200) or security questions and answers generator 394 (of system 300, described in connection to FIG. 3) may be stored in a security challenge question-answer pairs 246 data store associated with a user profile 240, described in system 200. Additional details regarding embodiments of step 570 are described in connection to verification component 290 of system 200.

At step 575, the updated authenticity score is compared against the first threshold. Some embodiments of step 575 may be performed by a PDA application or service, a virtual personal assistant, and/or a credentials manager, such as credentials manager 270, of system 200, described in connection to FIG. 2. If the updated authenticity score satisfies the first threshold, then at step 580, provide access to the first secure computing resource. On the other hand, if the updated authenticity score does not satisfy the first threshold, then at step 590, restrict access to the first secure computing resource. Some embodiments of steps 580 and 590 may be carried out as described in steps 450 and 460 of method 400 (FIG. 4).

Figure 6:
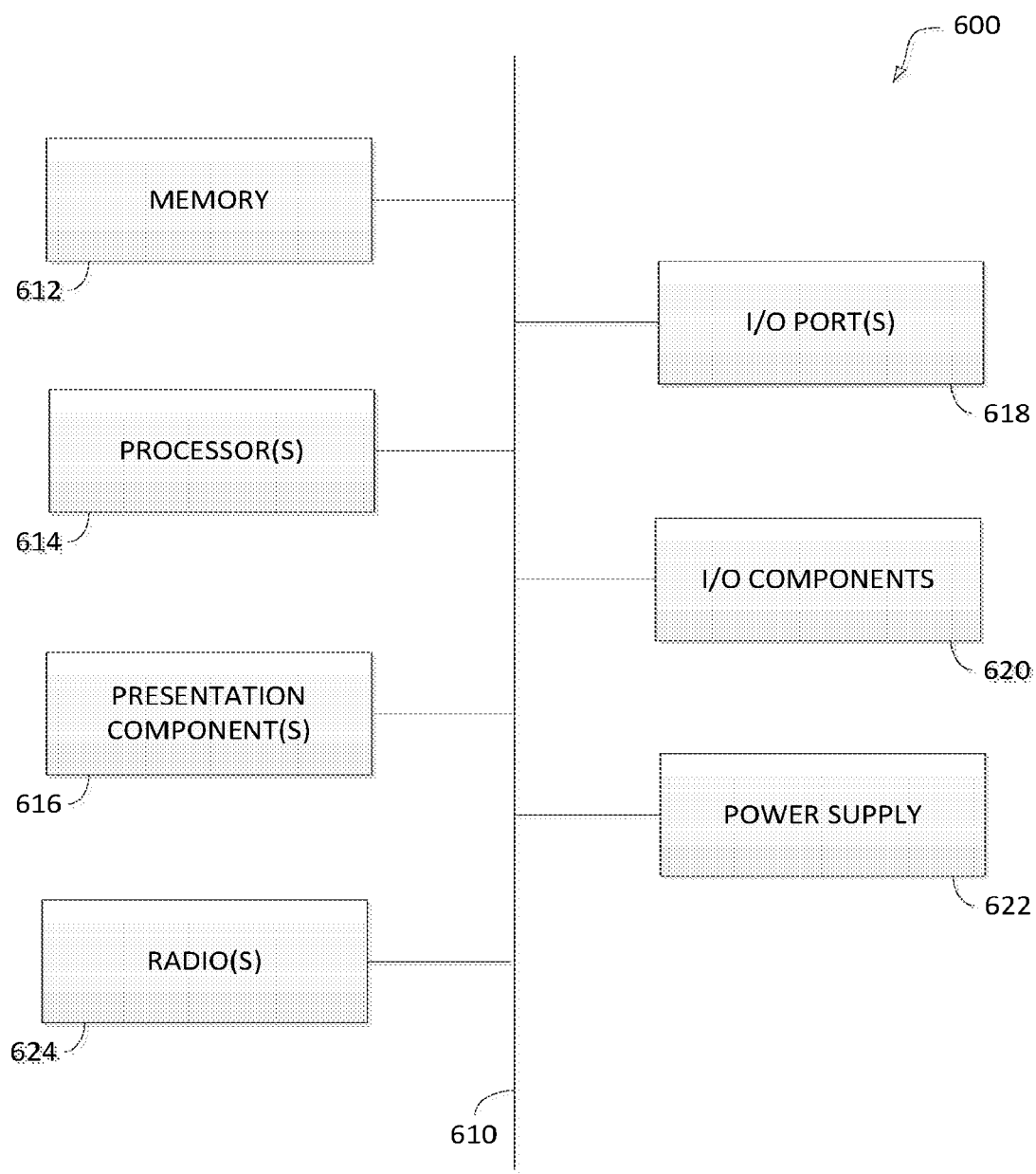
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. In some implementations presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A computing device comprising a computer memory and a computer processor that is configured to allow a personal digital assistant to control access to a secure computing resource based on a measure of legitimacy for a current user, the computing device comprising: the personal digital assistant that is a computer program stored on the computer memory having computer instructions configured to: a) monitor user-related activity for a current user-session on the computing device; b) determine an authentication confidence score for the user associated with the current user-session on the computing device, the authentication confidence score determined based on a comparison of information from the monitored user-related activity and a persona model corresponding to a legitimate user associated with the computing device; c) receive an indication of a request to access the secure computing resource; and d) if the determined authentication confidence score indicates the current user is likely the legitimate user, then granting access to the secure computing resource; and e) if the determined authentication confidence score does not indicate that the current user is likely to be the legitimate user, then restricting access to the secure computing resource, wherein the persona model is determined from user-related activity information of the legitimate user.

Embodiment 2

The computing device of embodiment 1, wherein the user-related activity information of the legitimate user used for determining the persona model comprises information detected via the computing device including one or more of a geographical location, a venue, a communication network, browsing history, application-usage history, or calling history.

Embodiment 3

The computing device of any of embodiments 1-2, wherein the persona model comprises one or more patterns of user-activity for the legitimate user, and wherein determining the authentication confidence score determined based on the comparison comprises determining a statistical indication of difference between the monitored user-related activity and the one or more patterns of user-activity for the legitimate user.

Embodiment 4

The computing device of any of embodiments 1-3, wherein the secure computing resource comprises at least one of a credential associated with the legitimate user, sensitive data associated with the legitimate user, a financial application or service, a purchase transaction, or a security setting associated with the computing device.

Embodiment 5

The computing device of any of embodiments 1-4, wherein the authentication confidence score indicates the current user is likely the legitimate user if the authentication confidence score satisfies a first threshold, and wherein the authentication confidence score does not indicate that the current user is likely to be the legitimate user if the authentication confidence score does not satisfy the first threshold.

Embodiment 6

The computing device of any of embodiments 1-5, wherein the first threshold is pre-determined based on the secure computing resource.

Embodiment 7

The computing device of any of embodiments 1-6, wherein the determined authentication confidence score does not indicate that the current user is likely to be the legitimate user, and wherein the computer instructions are further configured to: generate a security challenge based on the persona model corresponding to the legitimate user; cause the security challenge to be presented via the computing device; receive a response to the security challenge; evaluate the response to the security challenge; and update the authentication confidence score based on the received response.

Embodiment 8

The computing device of any of embodiments 1-7, wherein the security challenge comprises one or a biometric challenge, requesting a password, a static security question, or two-factor authentication procedure.

Embodiment 9

The computing device of any of embodiments 1-8, wherein the security challenge comprises a question and corresponding answer derived from the user-related activity information of the legitimate user.

Embodiment 10

The computing device of any of embodiments 1-9, wherein the user-related activity information of the legitimate user comprises information determined from one or more legitimate-user user-sessions conducted by the legitimate user within the previous two weeks.

Embodiment 11

The computing device of any of embodiments 1-10, wherein the user-related activity information of the legitimate user comprises at least one of: call history, location history, purchase history, browsing history, or social media activity.

Embodiment 12

The computing device of any of embodiments 1-11, wherein the monitored user-related activity comprises user-related activity information provided by a third-party application, and wherein the determined authentication confidence score is weighted based on the third-party application.

Embodiment 13

The computing device of any of embodiments 1-12, wherein the determined authentication confidence score indicates that the current user is likely to be the legitimate user, and wherein the computer instructions are further configured to update the persona model to include information from the monitored user-related activity for the current user-session on the computing device.

Embodiment 14

A computerized method for providing access to secure computing resources comprising: monitoring, during a current user session, user-related activity associated with at least one computing device; determining an initial authenticity score for a current user associated with the current user-session, the initial authenticity score determined based on a comparison of information from the monitored user-related activity and a persona model corresponding to a legitimate user associated with the at least one computing device; receiving a first indication of a request to access a first secure computing resource, the first secure computing resource having a corresponding first authenticity score threshold; determining that the initial authenticity score does not satisfy the first authenticity score threshold; providing a security challenge to the current user; receiving a response to the security challenge; based on an evaluation of the received response, updating the initial authenticity score to an updated authenticity score; and based on a comparison of the updated authenticity score and the first threshold, if the updated authenticity score satisfies the first threshold, then providing access to the first secure computing resource; and if the updated authenticity score does not satisfy the first threshold, then restricting access to the first secure computing resource.

Embodiment 15

The method of embodiment 14, wherein the at least one computing device comprises one or more a user devices, one

45 or more servers, or a combination of one or more user devices and one or more servers.

Embodiment 16

The method of any of embodiments 14-15, wherein the persona model comprises user-related activity information of the legitimate user, and wherein the security challenge comprises a question and is based on a portion of the user-related activity information of the legitimate user that occurred within the past seven days.

Embodiment 17

The method of any of embodiments 14-16, wherein the portion of the user-related activity information of the legitimate user that occurred within the past seven days is provided from a third-party application or service.

Embodiment 18

The method of any of embodiments 14-16, further comprising: receiving a second indication of a request to access a second secure computing resource, the second secure computing resource having a corresponding second authenticity score threshold that is different than the first authenticity score threshold; determining that the initial authenticity score satisfies the second authenticity score threshold; and providing access to the second secure computing resource.

Embodiment 19

A computerized system comprising: one or more sensors configured to provide sensor data; one or more computing devices, at least one of the computing devices including a credentials manager configured to control access to a secure computing resource; one or more processors; and one or more computer storage media storing computer-useable instructions that, when used by the one or more processors, cause the one or more processors to perform operations comprising: a) monitoring user-related activity for a current user-session on the one or more computing devices, the user-related activity for a current user-session including sensor data from the one or more sensors; b) determining an authentication confidence score for a user associated with the current user-session on the one or more computing devices, the authentication confidence score determined based on a comparison of information from the monitored user-related activity and a persona model corresponding to a legitimate user associated with the one or more computing devices; c) receiving an indication of a request to access the secure computing resource; and d) if the determined authentication confidence score indicates the current user is likely the legitimate user, then granting, by the credentials manager, access to the secure computing resource; and e) if the determined authentication confidence score does not indicate that the current user is likely to be the legitimate user, then restricting, by the credentials manager, access to the secure computing resource, wherein the persona model is determined from user-related activity information of the legitimate user.

Embodiment 20

The computerized system of embodiment 19, wherein the determined authentication confidence score does not indicate that the current user is likely to be the legitimate user, and the operations further comprising: generating a security challenge based on the persona model corresponding to the legitimate user; causing the security challenge to be presented via the one or more computing devices; receiving a response to the security challenge; evaluating the response to the security challenge; updating the authentication confidence score based on the received response thereby forming an updated authentication confidence score; determining that the updated authentication confidence score indicates the current user is likely the legitimate user; and granting, by the credentials manager, access to the secure computing resource, wherein the authentication confidence score indicates the current user is likely the legitimate user if the authentication confidence score satisfies a first threshold, wherein the authentication confidence score does not indicate that the current user is likely to be the legitimate user if the authentication confidence score does not satisfy the first threshold, and wherein the first threshold is pre-determined based on the secure computing resource.

The invention claimed is:

1. A computing device comprising a computer memory and a computer processor that is configured to control access to user credentials based on a measure of legitimacy for a current user, the computing device comprising:
a computer program stored on the computer memory having computer instructions that when executed by the computer processor:
monitor ongoing user-related activity for the current user associated with a current user session on the computing device;
determine an authentication confidence score for the user associated with the current user session on the computing device, wherein the authentication confidence score is determined based on a comparison of information from the monitored ongoing user related activity and a persona model corresponding to a legitimate user associated with the computing device, the authentication confidence score to be used when the current user attempts to access a secure computing resource, and wherein the persona model is determined from user-related activity information of the legitimate user and comprises activity patterns of the legitimate user;
receive an indication of a request to access a first secure computing resource;
if the determined authentication confidence score indicates the current user is likely the legitimate user, then granting access to a user credential that is required to access the first secure computing resource; and
if the determined authentication confidence score does not indicate that the current user is likely to be the legitimate user, then restricting access to the user credential.

2. The computing device of claim 1, wherein the user-related activity information of the legitimate user used for determining the persona model comprises information detected via the computing device including one or more of a geographical location, a venue, a communication network, browsing history, application-usage history, or calling history.

3. The computing device of claim 2, wherein the persona model comprises one or more patterns of user-activity for the legitimate user, and wherein determining the authentication confidence score based on the comparison comprises determining a statistical indication of difference between the monitored user-related activity and the one or more patterns of user-activity for the legitimate user.

4. The computing device of claim 1, wherein the first secure computing resource comprises at least one of sensitive data associated with the legitimate user, a financial application or service, a purchase transaction, or a security setting associated with the computing device, and wherein at least two secure computing resources in the set of secure computing resources are unrelated.

5. The computing device of claim 1, wherein the authentication confidence score indicates the current user is likely the legitimate user if the authentication confidence score satisfies a first threshold, and wherein the authentication confidence score does not indicate that the current user is likely to be the legitimate user if the authentication confidence score does not satisfy the first threshold.

6. The computing device of claim 5, wherein the first threshold is pre-determined based on the first secure computing resource.

7. The computing device of claim 1, wherein the determined authentication confidence score does not indicate that the current user is likely to be the legitimate user, and wherein the computer instructions are further configured to:
generate a security challenge based on the persona model corresponding to the legitimate user;
cause the security challenge to be presented via the computing device;
receive a response to the security challenge;
evaluate the response to the security challenge; and
update the authentication confidence score based on the received response.

8. The computing device of claim 7, wherein the security challenge comprises one of a biometric challenge, requesting a password, a static security question, or two-factor authentication procedure.

9. The computing device of claim 7, wherein the security challenge comprises a question and corresponding answer derived from the user-related activity information of the legitimate user.

10. The computing device of claim 9, wherein the user-related activity information of the legitimate user comprises information determined from one or more legitimate-user user-sessions conducted by the legitimate user within the previous two weeks.

11. The computing device of claim 10, wherein the user-related activity information of the legitimate user comprises at least one of: call history, location history, purchase history, browsing history, or social media activity.

12. The computing device of claim 1, wherein the monitored user-related activity comprises user-related activity information provided by a third-party application, and wherein the determined authentication confidence score is weighted based on the third-party application.

13. The computing device of claim 1, wherein the determined authentication confidence score indicates that the current user is likely to be the legitimate user, and wherein the computer instructions are further configured to update the persona model to include information from the monitored user-related activity for the current user-session on the computing device.

14. A computerized method for controlling access to user credentials, comprising:
monitoring, during a current user session associated with a current user, ongoing user-related activity associated with at least one computing device;
determining an initial authenticity score for the current user, the initial authenticity score determined based on a comparison of information from the monitored ongoing user-related activity and a persona model corresponding to a legitimate user associated with the at least one computing device, the initial authenticity score to be used when the current user attempts to access a user credential;
receiving a first indication of a request to access a first user credential, the first user credential having a corresponding first authenticity score threshold;
determining that the initial authenticity score does not satisfy the first authenticity score threshold;
providing a security challenge to the current user, wherein the security challenge is derived from user-related activity information of the legitimate user for one or more previous user sessions during which an authenticity score for the one or more previous user sessions was above a given threshold;
receiving a response to the security challenge;
based on an evaluation of the received response, updating the initial authenticity score to an updated authenticity score to be used to authenticate the current user; and
based on a comparison of the updated authenticity score and the first authenticity score threshold,
if the updated authenticity score satisfies the first authenticity score threshold, then providing access to the first user credential; and
if the updated authenticity score does not satisfy the first authenticity score threshold, then restricting access to the first user credential.

15. The method of claim 14, wherein the at least one computing device comprises one or more user devices, one or more servers, or a combination of one or more user devices and one or more servers.

16. The method of claim 14, wherein the persona model comprises user-related activity information of the legitimate user, and wherein the security challenge comprises a question and is based on a portion of the user-related activity information of the legitimate user that occurred within the past seven days.

17. The method of claim 16, wherein the portion of the user-related activity information of the legitimate user that occurred within the past seven days is provided from an online third-party application or an online third-party service.

18. The method of claim 14, further comprising:
receiving a second indication of a request to access a second user credential, the second user credential having a corresponding second authenticity score threshold that is different than the first authenticity score threshold;
determining that the initial authenticity score satisfies the second authenticity score threshold; and
providing access to the second user credential.

19. A computerized system comprising:
one or more sensors configured to provide sensor data;
one or more computing devices, at least one of the computing devices including a credentials manager configured to control access to one or more user credentials;
one or more processors; and
one or more computer storage media storing computer-useable instructions that, when used by the one or more processors, cause the one or more processors to perform operations comprising:
monitoring ongoing user-related activity for a current user session on the one or more computing devices, the user-related activity for the current user session including sensor data from the one or more sensors;

determining an authentication confidence score for a user associated with the current user session on the one or more computing devices, wherein the authentication confidence score is determined based on a comparison of information from the monitored ongoing user-related activity and a persona model corresponding to a legitimate user associated with the one or more computing devices, the authentication confidence score to be used when the current user attempts to access the one or more user credentials, and wherein the persona model is determined from user-related activity information of the legitimate user detected on the one or more computing devices;

receiving an indication of a request to access a user credential;

if the determined authentication confidence score indicates the current user is likely the legitimate user, then granting, by the credentials manager, access to the user credential; and if the determined authentication confidence score does not indicate that the current user is likely to be the legitimate user, then restricting, by the credentials manager, access to the user credential.

20. The computerized system of claim 19 wherein the determined authentication confidence score does not indicate that the current user is likely to be the legitimate user, and the operations further comprising:

generating a security challenge based on the persona model corresponding to the legitimate user;

causing the security challenge to be presented via the one or more computing devices;

receiving a response to the security challenge;

evaluating the response to the security challenge;

updating the authentication confidence score based on the received response thereby forming an updated authentication confidence score;

determining that the updated authentication confidence score indicates the current user is likely the legitimate user; and granting, by the credentials manager, access to the user credential, wherein the authentication confidence score indicates the current user is likely the legitimate user if the authentication confidence score satisfies a first threshold, wherein the authentication confidence score does not indicate that the current user is likely to be the legitimate user if the authentication confidence score does not satisfy the first threshold.

* * * * *